US011928974B2

(12) United States Patent
John et al.

(10) Patent No.: US 11,928,974 B2
(45) Date of Patent: Mar. 12, 2024

(54) UNMANNED AIRCRAFT, INFORMATION PROCESSING METHOD, AND RECORDING MEDIUM

(71) Applicant: Panasonic Intellectual Property Management Co., Ltd., Osaka (JP)

(72) Inventors: Stephen William John, Nara (JP); Kazunobu Konishi, Osaka (JP); Katsuhiko Asai, Nara (JP); Kazuo Inoue, Osaka (JP); Shunsuke Kuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 315 days.

(21) Appl. No.: 17/231,679

(22) Filed: Apr. 15, 2021

(65) Prior Publication Data
US 2021/0233416 A1  Jul. 29, 2021

Related U.S. Application Data

(63) Continuation of application No. PCT/JP2019/043783, filed on Nov. 8, 2019.

(30) Foreign Application Priority Data

Feb. 19, 2019  (JP) ................. 2019-027725

(51) Int. Cl.
*G08G 5/00* (2006.01)
*B64C 39/02* (2023.01)
(Continued)

(52) U.S. Cl.
CPC ......... *G08G 5/0069* (2013.01); *B64C 39/024* (2013.01); *B64U 10/13* (2023.01);
(Continued)

(58) Field of Classification Search
CPC ... G08G 5/0069; B64C 39/024; B64C 11/001; B64C 13/18; B64C 13/20; B64U 10/13;
(Continued)

(56) References Cited

U.S. PATENT DOCUMENTS

2006/0143017 A1  6/2006 Sonoura et al.
2016/0063987 A1  3/2016 Xu et al.
(Continued)

FOREIGN PATENT DOCUMENTS

EP  2 667 216  7/2017
JP  2006-134221  5/2006
(Continued)

OTHER PUBLICATIONS

International Search Report (ISR) dated Jan. 28, 2020 in International (PCT) Application No. PCT/JP2019/043783.
(Continued)

*Primary Examiner* — Alan D Hutchinson
(74) *Attorney, Agent, or Firm* — Wenderoth, Lind & Ponack, L.L.P.

(57) ABSTRACT

An unmanned aircraft includes: a sensor that includes at least a microphone that generates sound data; and a processor. The processor determines quality of a target sound using the sound data generated by the microphone, obtains a positional relationship between the unmanned aircraft and a sound source of the target sound using data generated by the sensor, and controls movement of the unmanned aircraft to control a distance between the unmanned aircraft and the sound source of the target sound, in accordance with the quality of the target sound and the positional relationship.

11 Claims, 15 Drawing Sheets

(51) Int. Cl.
*B64U 10/13* (2023.01)
*B64U 30/20* (2023.01)
*B64U 101/30* (2023.01)

(52) U.S. Cl.
CPC .......... *B64U 30/20* (2023.01); *B64U 2101/30* (2023.01); *B64U 2201/10* (2023.01)

(58) Field of Classification Search
CPC ................ B64U 30/20; B64U 2101/30; B64U 2201/10; B64U 2201/00; G01S 2205/03; G01S 5/18; G01S 3/8036; G01S 5/28; B64D 31/06; B64D 45/00; B64D 47/08; G05D 1/102
See application file for complete search history.

(56) References Cited

U.S. PATENT DOCUMENTS

| | | | |
|---|---|---|---|
| 2016/0313743 A1 | 10/2016 | Kim | |
| 2017/0031369 A1* | 2/2017 | Liu | ...................... G08G 5/0069 |
| 2017/0220036 A1* | 8/2017 | Visser | .................. G05D 1/0094 |
| 2019/0035288 A1 | 1/2019 | Beltman et al. | |
| 2019/0043465 A1* | 2/2019 | Cordourier Maruri | ...................... G10L 21/0208 |
| 2019/0297412 A1* | 9/2019 | Hentunen | .............. H04K 3/825 |

FOREIGN PATENT DOCUMENTS

| | | |
|---|---|---|
| JP | 2006-181651 | 7/2006 |
| JP | 2007-158958 | 6/2007 |
| JP | 2007-280417 | 10/2007 |
| JP | 2008-126329 | 6/2008 |
| JP | 2017-502568 | 1/2017 |
| JP | 2019-6154 | 1/2019 |
| WO | 2016/029469 | 3/2016 |

OTHER PUBLICATIONS

Extended European Search Report dated Apr. 29, 2022 in corresponding European Patent Application No. 19915970.8.

* cited by examiner

FIG. 13

| Reference S/N ratio [dB] | | Purpose |
|---|---|---|
| R1 | Lower | Sound recording of lowest quality |
| R2 | | Typical sound collection |
| R3 | | Relay broadcast |
| R4 | Higher | Broadcast of high quality |

UNMANNED AIRCRAFT, INFORMATION PROCESSING METHOD, AND RECORDING MEDIUM

CROSS REFERENCE TO RELATED APPLICATION(S)

This is a continuation application of PCT International Application No. PCT/JP2019/043783 filed on Nov. 8, 2019, designating the United States of America, which is based on and claims priority of Japanese Patent Application No. 2019-027725 filed on Feb. 19, 2019. The entire disclosures of the above-identified applications, including the specifications, drawings and claims are incorporated herein by reference in their entirety.

FIELD

The present disclosure relates to an unmanned aircraft, an information processing method, and a recording medium.

BACKGROUND

Patent Literature (PTL) 1 discloses an unmanned airplane that performs a process for removing background noise from audio data collected by a background microphone.

CITATION LIST

Patent Literature

PTL 1: Japanese Unexamined Patent Application Publication (Translation of PCT Application) No. 2017-502568

SUMMARY

Technical Problem

Unfortunately, the technology disclosed in PTL 1 is developed with little regard for safety of a sound source. Thus, it may be difficult to enhance quality of sound recording in addition to ensuring the safety.

In view of this, the present disclosure provides an unmanned aircraft, an information processing method, and a recording medium that are capable of enhancing quality of sound recording in addition to ensuring safety of a sound source.

Solution to Problem

An unmanned aircraft according to the present disclosure includes: a sensor that includes at least a microphone that generates sound data; and a processor, wherein the processor determines quality of a target sound using the sound data generated by the microphone, obtains a positional relationship between the unmanned aircraft and a sound source of the target sound using data generated by the sensor, and controls movement of the unmanned aircraft to control a distance between the unmanned aircraft and the sound source of the target sound, in accordance with the quality of the target sound and the positional relationship.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof.

Advantageous Effects

The unmanned aircraft, the information processing method, and the recording medium according to the present disclosure are capable of enhancing the quality of sound recording in addition to ensuring the safety of the sound source.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 13 is a table illustrating an example of a relationship between a reference S/N ratio and a purpose.

Figure 1:
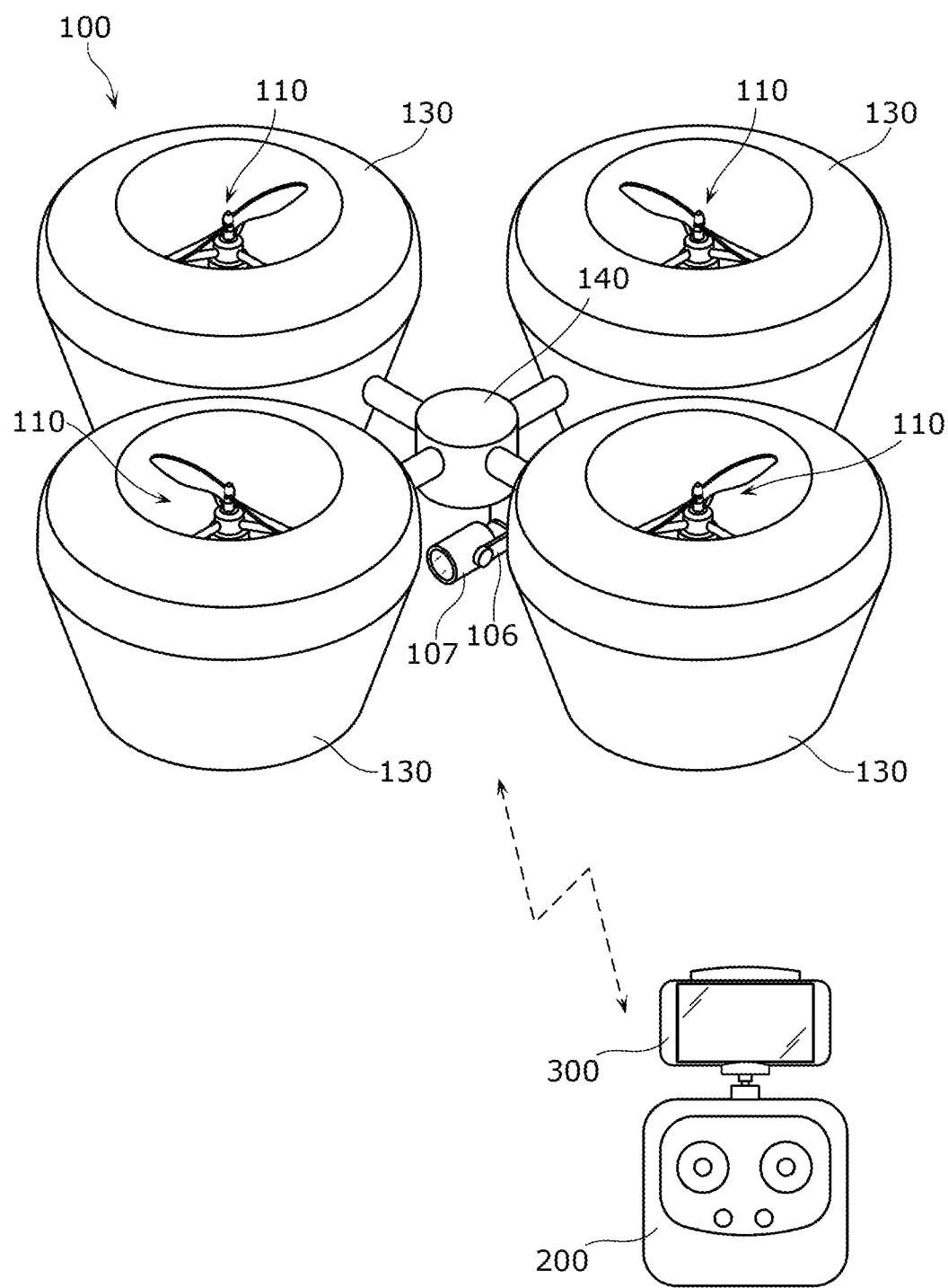
FIG. 1 illustrates an external view of an unmanned aircraft and a controller according to an embodiment.

DESCRIPTION OF EMBODIMENT (Underlying Knowledge Forming Basis of the Present Disclosure)

As described above, the unmanned airplane disclosed in PTL 1 performs the process for removing the background noise, which is caused from a propellant unit like a rotor included in the unmanned airplane, from the collected audio data. However, this unmanned airplane does not use a relative positional relationship with the sound source that is a target for collecting the audio data. For this reason, the sound source may not be present in a sound recording area of a sound-source collecting microphone included in the unmanned airplane to detect a target sound from the sound source. In this sound recording area, the sound-source collecting microphone effectively performs sound recording. When the sound source is not present in the sound recording area of the sound-source collecting microphone, the sound-source collecting microphone is unable to effectively pick up the target sound. As a result, the background noise is relatively more collected. This increases noise components of the audio data obtained by the sound-source collecting microphone and thus reduces a signal-to-noise (S/N) ratio. Thus, even if the process for removing the background noise from the obtained audio data is performed, it is difficult to obtain audio data of high quality.

To address this, the unmanned airplane may approach the sound source to collect the audio data so that the target sound from the sound source is relatively more collected than the background noise. The unmanned airplane may move in a direction to approach the sound source and collect the audio data at a close distance from the sound source. In this case, if the unmanned airplane is out of control or has a problem with an actuator that develops a thrust force of the unmanned airplane, the unmanned airplane may fall down onto the sound source. On this account, safety of the sound source is to be ensured by taking safety measures, such as enclosing the sound source with a guard net. More specifically, ensuring the safety of the sound source is difficult without additionally expending energy and cost of manufacturing and placing the guard net.

In order to solve the above problem, an unmanned aircraft according to the present disclosure includes: a sensor that includes at least a microphone that generates sound data; and a processor, wherein the processor determines quality of a target sound using the sound data generated by the microphone, obtains a positional relationship between the unmanned aircraft and a sound source of the target sound using data generated by the sensor, and controls movement of the unmanned aircraft to control a distance between the unmanned aircraft and the sound source of the target sound, in accordance with the quality of the target sound and the positional relationship.

Thus, the quality of the target sound can be ensured while the distance between the unmanned aircraft and the sound source is controlled. This enhances the quality of sound recording in addition to ensuring safety of the sound source.

It is possible that when the quality of the target sound is higher than a predetermined goal quality, the processor causes the unmanned aircraft to move away from the sound source.

Thus, the unmanned aircraft moves away from the sound source within the area to maintain the goal quality. This further enhances the safety of the sound source.

It is possible that when causing the unmanned aircraft to move away from the sound source, the processor causes the unmanned aircraft to move to any position between a current position of the unmanned aircraft and a position at which the quality of the target sound reaches the predetermined goal quality.

This enhances the safety of the sound source while ensuring the quality of sound recording without fall below the goal quality.

It is possible that when the quality of the target sound is lower than the predetermined goal quality, the processor causes the unmanned aircraft to approach the sound source.

Thus, the unmanned aircraft approaches the sound source within the area to satisfy the goal quality. This further enhances the quality of sound recording in addition to ensuring the safety of the sound source.

It is possible that the processor further obtains distance information indicating a predetermined distance from the sound source, and when causing the unmanned aircraft to approach the sound source, the processor controls the movement of the unmanned aircraft in accordance with the distance information and the positional relationship to cause the unmanned aircraft not to approach any closer to the sound source than a position at the predetermined distance from the sound source.

Thus, the unmanned aircraft is caused to move in the direction to approach the sound source within the area to ensure the safety of the sound source. As a result, at least the predetermined distance is left between the sound source and the unmanned aircraft. This reliably ensures the safety of the sound source in addition to enhancing the quality of sound recording.

It is possible that the unmanned aircraft further includes: an actuator that changes at least one of an orientation of the microphone or an amount of outward projection of the microphone from the unmanned aircraft, wherein when the quality of the target sound is lower than the predetermined goal quality even after the processor controls the movement of the unmanned aircraft in accordance with the distance information and the positional relationship to cause the unmanned aircraft to move, to approach the sound source, to the position at the predetermined distance from the sound source, the processor causes the actuator to change at least one of the orientation of the microphone or the amount of outward projection of the microphone from the unmanned aircraft.

Thus, when causing the orientation of the microphone to be changed by controlling the actuator, the processor can orient a direction in which the microphone has a high sensitivity toward the sound source. As a result, the high-sensitivity direction of the microphone is aligned with the direction of the sound source. Thus, the sound pressure level of the target sound with respect to the sound pressure level of the noise can be relatively increased, which enhances the quality of sound recording.

When causing the amount of outward projection of the microphone from the unmanned aircraft to be changed by controlling the actuator, the processor allows the microphone to project outwardly from the unmanned aircraft to approach the sound source. As a result, the microphone is distanced from the unmanned aircraft that is a noise source, and thus the sound pressure level of the noise can be reduced. Moreover, the microphone approaches the sound source in this case. Thus, the sound pressure level of the target sound with respect to the sound pressure level of the noise can be relatively increased. This effectively enhances the quality of sound recording.

It is possible that the processor calculates a signal-to-noise (S/N) ratio using the target sound and noise related to flight of the unmanned aircraft, as an indicator for determining the quality.

This allows the quality of the target sound to be easily determined.

It is possible that the processor further obtains a goal S/N ratio precalculated using the noise related to the flight of the unmanned aircraft, as the predetermined goal quality, and determines the quality of the target sound by comparing the goal S/N ratio obtained and the S/N ratio calculated.

The prior calculation of the goal S/N ratio can reduce an amount of processing load of determining the quality of sound recording.

The processor may control the unmanned aircraft so that the unmanned aircraft moves in the horizontal direction. As a result, the unmanned aircraft moves in the horizontal direction away from the sound source. This leaves a distance from the sound source in the horizontal direction. In this case, the unmanned aircraft does not move to a position higher than the current position. Thus, an impact in case of falling of the unmanned aircraft can be reduced to ensure the safety of the sound source.

It is possible that the processor causes the unmanned aircraft to approach ground.

As a result, the unmanned aircraft moves in the direction to approach the ground to approach the sound source. This allows the unmanned aircraft to approach the sound source while maintaining the distance from the sound source in the horizontal direction. In this way, unmanned aircraft 100 is closer to the ground than the current position is. Thus, an impact in case of falling of the unmanned aircraft can be reduced to ensure the safety of the sound source.

The processor may obtain the positional relationship using the sound data. In this case, the mounted microphone alone allows the quality of sound recording to be enhanced in addition to ensuring the safety of the sound source. This eventually suppresses an increase in gross weight of the unmanned aircraft.

It is possible that the sensor further includes an image sensor that generates image data, and the processor obtains the positional relationship using the image data generated by the image sensor.

In this way, the processor obtains the positional relationship using the image data. Thus, the positional relationship with high precision can be obtained.

It is possible that the sensor further includes a ranging sensor that generates ranging data, and the processor obtains the positional relationship using the ranging data generated by the ranging sensor.

In this way, the processor obtains the positional relationship using the ranging data. Thus, the positional relationship with high precision can be obtained.

It is possible that the processor determines a goal distance in accordance with the quality of the target sound, the positional relationship, and the predetermined goal quality, and controls the movement of the unmanned aircraft to cause the distance between the unmanned aircraft and the sound source to reach the goal distance.

As a result, the unmanned aircraft can move to the position corresponding to the predetermined goal quality.

It is possible that the positional relationship is at least one of (i) the distance between the unmanned aircraft and the sound source, (ii) a position of the sound source with respect to the unmanned aircraft, or (iii) a direction from the unmanned aircraft to the sound source.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof.

Hereinafter, the unmanned aircraft according to an aspect of the present disclosure will be described in detail with reference to the drawings.

The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment

The following describes an embodiment with reference to FIG. 1 to FIG. 12B.

[1. Configuration]

Figure 2:
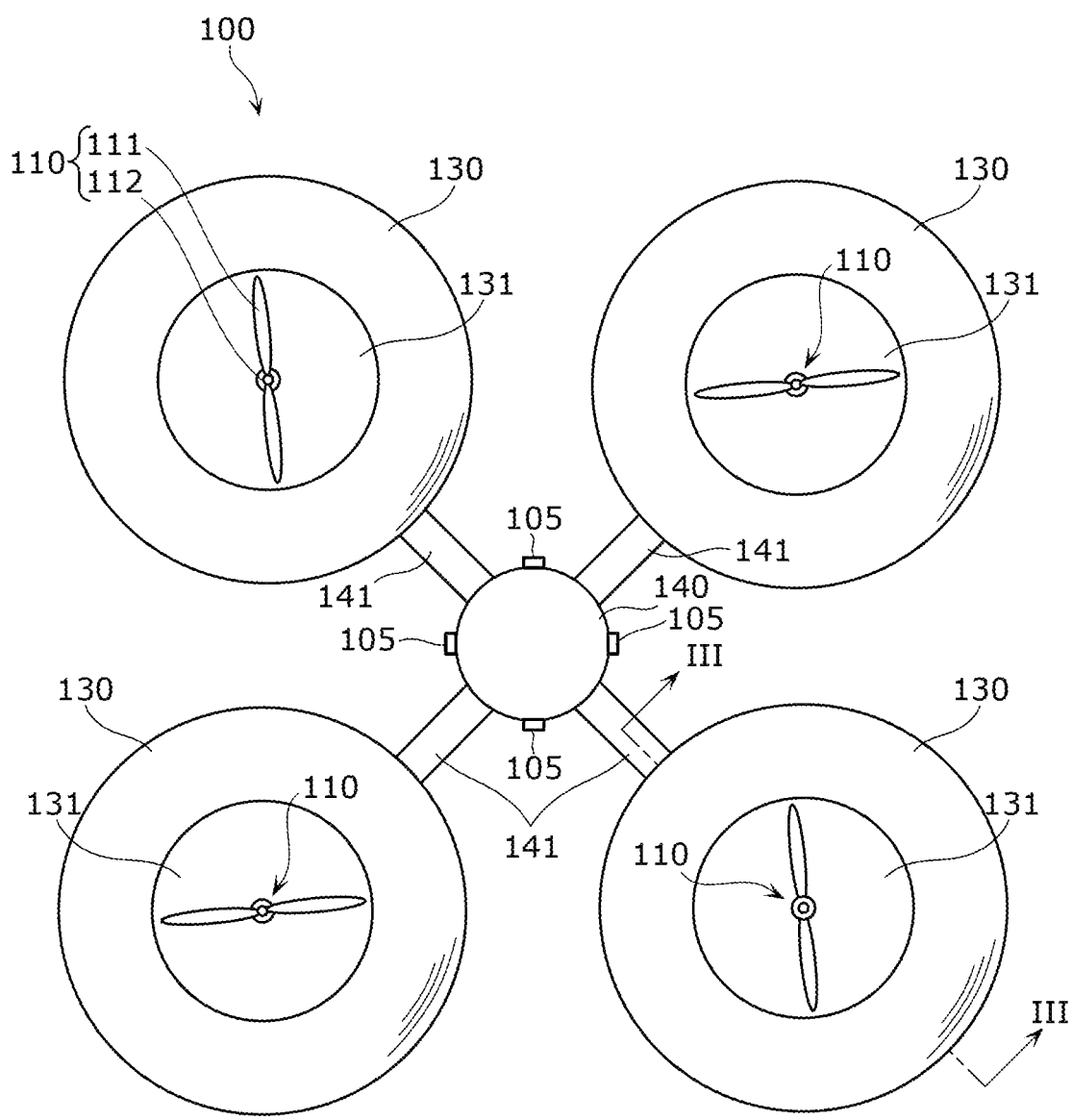
FIG. 2 is a plan view of the unmanned aircraft seen from above, according to the embodiment.

FIG. 1 illustrates an external view of an unmanned aircraft and a controller according to the embodiment. FIG. 2 is a plan view of the unmanned aircraft seen from above according to the embodiment.

As illustrated in FIG. 1, unmanned aircraft 100 receives, from controller 200, an operation signal based on an operation performed on controller 200 by a user. Unmanned aircraft 100 flies according to the received operation signal. During flight, unmanned aircraft 100 may capture an image using camera 107 included in unmanned aircraft 100, according to the received operation signal. Image data captured by camera 107 may be transmitted to mobile terminal 300 described later.

Receiving the operation from the user, controller 200 transmits the operation signal based on the received operation to unmanned aircraft 100. Controller 200 may hold mobile terminal 300 having a display, such as a smartphone.

Mobile terminal 300 receives the image data captured by camera 107 of unmanned aircraft 100, and displays the image data received in real time, for example.

Thus, while visually verifying in real time the image data captured by camera 107 of unmanned aircraft 100 and displayed on mobile terminal 300, the user can operate controller 200 to change a flight state, which is at least one of position or attitude of unmanned aircraft 100 during flight. This allows the user to freely change an imaging area of camera 107 of unmanned aircraft 100.

Unmanned aircraft 100 includes four generators 110, four ducts 130, main body 140, and four arms 141.

Each of generators 110 generates a force to fly unmanned aircraft 100. To be more specific, each of generators 110 produces an airflow to generate the force to fly unmanned aircraft 100. Each of generators 110 includes: rotor 111 that rotates to generate an airflow; and actuator 112 that rotates rotator 111. Rotor 111 and actuator 112 have rotation axes roughly parallel to each other in a vertical direction when unmanned aircraft 100 is placed on a horizontal plane, and generate an airflow flowing downward from above. Thus, four generators 110 generate a thrust force for unmanned aircraft 100 to ascend and also generate a force for unmanned aircraft 100 to fly. Actuator 112 is a motor, for example.

When viewed from above, four generators 110 are arranged at angular intervals of 90 degrees around main body 140. To be more specific, four generators 110 are arranged circularly to encompass main body 140.

Rotor 111 provided for each of generators 110 includes one propeller as illustrated. However, this is not intended to be limiting. Rotor 111 may include two contra-rotating propellers that rotate about the same rotation axis in opposite directions.

Figure 3:
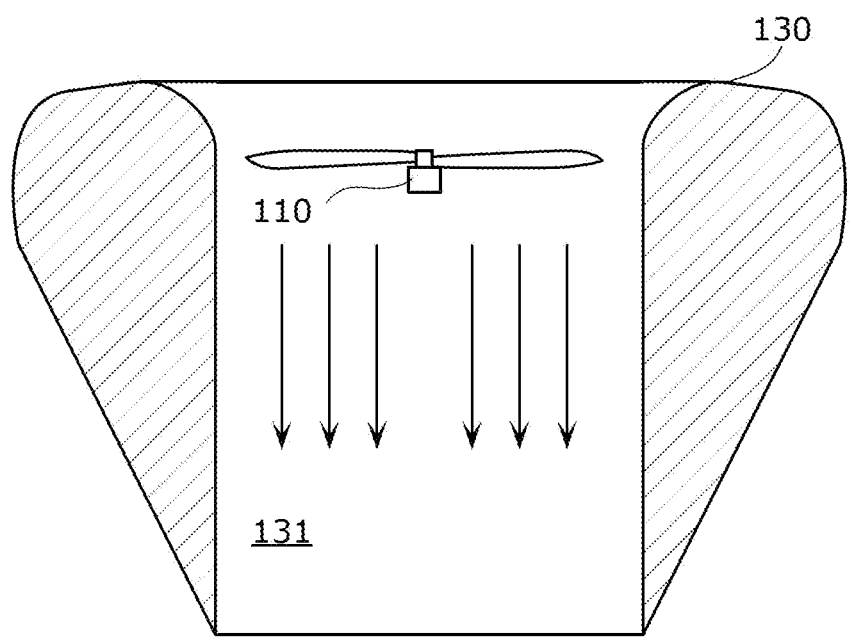
FIG. 3 is a cross-sectional view of the unmanned aircraft along line III-III illustrated in FIG. 2.

FIG. 3 is a cross-sectional view of the unmanned aircraft along line III-III illustrated in FIG. 2. More specifically, FIG. 3 is a cross-sectional view of generator 110 and duct 130, which is disposed corresponding to this generator 110, along a plane passing through the rotation axis of rotor 111.

Each of ducts 130 is provided for a corresponding one of four generators 110. Each of ducts 130 is disposed to cover the corresponding one of generators 110 laterally, or more specifically, disposed to cover this generator 110 in a direction roughly orthogonal to the rotational axis of rotor 111 of this generator 110. For example, each of four ducts 130 covers the corresponding one of generators 140 laterally over a length of this generator 110 in a rotational axis direction. To be more specific, each of four ducts 130 includes space 131 in which generator 110 is disposed and which is a circular cylinder passing through this duct 130 in a vertical direction. Each of ducts 130 has a shape that decreases in thickness in a downstream direction in which the airflow generated by the corresponding one of generators 110 flows. More specifically, each of four ducts 130 has an outer surface that approaches an inner surface of this duct 130 in the downstream direction in which the airflow generated by the corresponding one of generators 110 flows. In other words, each of four ducts 130 has a shape that tapers down toward the downstream of the airflow generated by the corresponding one of generators 110. An end part of the inner surface of duct 130 on an upstream side of the airflow is rounded. To be more specific, duct 130 has this end part that decreases in inside diameter of duct 130 in the direction in which the airflow flows. This allows air to easily enter duct 130 and thus enhances flight performance. Moreover, this achieves weight reduction of duct 130, and weight reduction of unmanned aircraft 100 eventually. Here, the end part may have a linear shape along the direction in which the airflow flows.

Main body 140 is a cylindrical box-like component for example, or more specifically, a housing. Main body 140 contains electronic devices including a processor, a memory, a battery, and various sensors. The shape of main body 140 is not limited to a cylinder, and may be a box-like shape in a different form, such as a quadrangular prism. Moreover, four microphones 105, gimbal 106, and camera 107 are disposed outside main body 140. For example, each of four microphones 105 is disposed in a region, on a side surface of main body 140, between two regions among four regions in each of which one of four arms 141 corresponding to four generators 110 is connected. More specifically, with main body 140 being the center, each of microphones 105 is disposed to face in a direction shifted by 45 degrees with respect to a direction in which generator 110 is located.

Each of four arms 141 is a component that connects main body 140 to a corresponding one of four ducts 130. Each of four arms 141 has one end fixed to main body 140 and the other end fixed to the corresponding one of four ducts 130.

Figure 4:
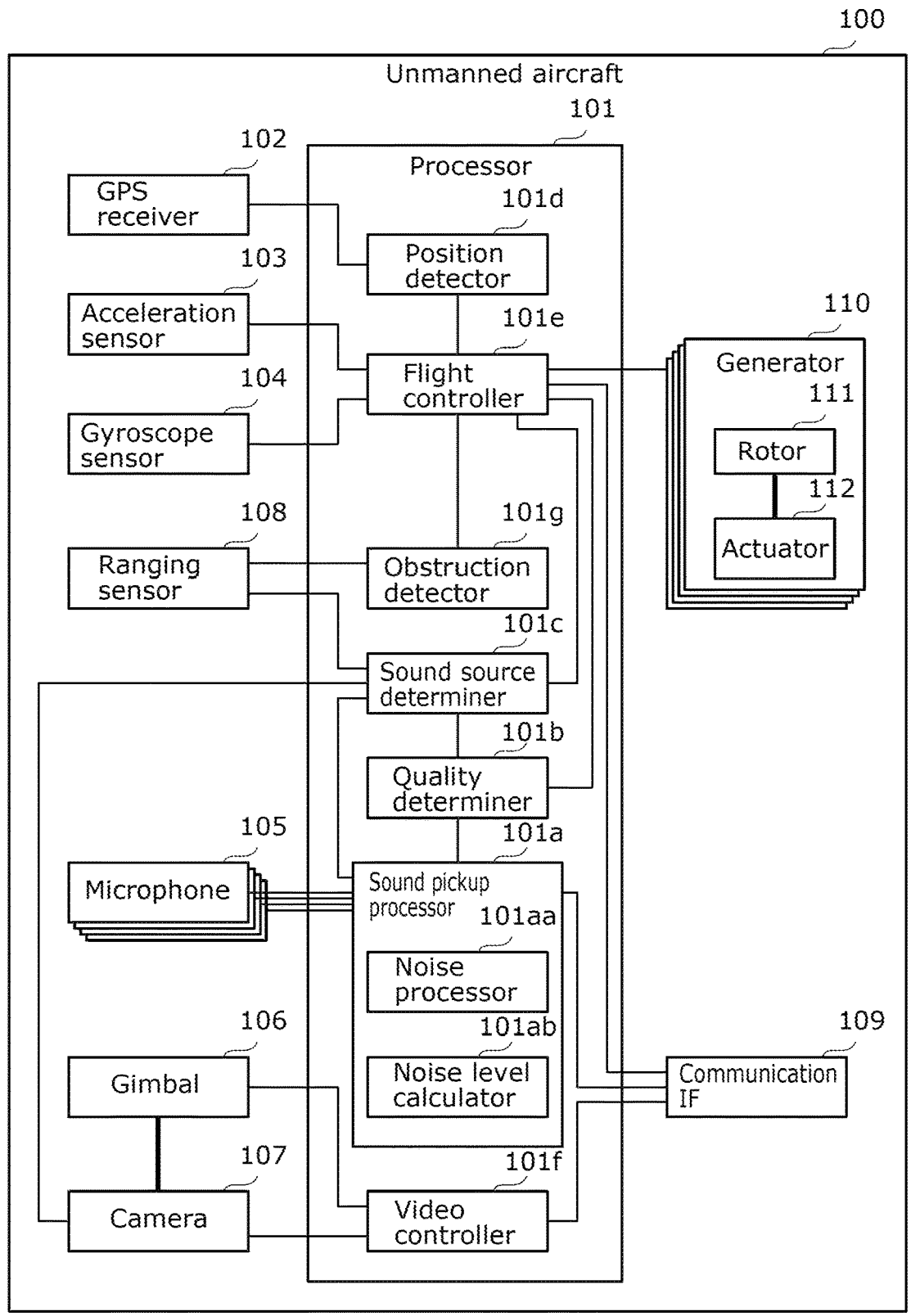
FIG. 4 is a block diagram illustrating a configuration of the unmanned aircraft according to the embodiment.

FIG. 4 is a block diagram illustrating a configuration of the unmanned aircraft according to the embodiment. More specifically, FIG. 4 is a block diagram illustrating a function of processor 101 implemented by a hardware configuration of unmanned aircraft 100.

As illustrated in FIG. 4, unmanned aircraft 100 includes processor 101, global positioning system (GPS) receiver 102, acceleration sensor 103, gyroscope sensor 104, four microphones 105, gimbal 106, camera 107, ranging sensor 108, communication interface (IF) 109, and four generators 110.

Processor 101 obtains detection results from various sensors including acceleration sensor 103, gyroscope sensor 104, four microphones 105, an image sensor of camera 107, and ranging sensor 108 and also obtains a reception result from GPS receiver 102 or communication IF 109, for example. In response to the obtained detection results or reception result, processor 101 performs a corresponding process by executing a predetermined program stored in a memory or storage that is not shown. In this case, processor 101 controls at least one of gimbal 106, camera 107, and four generators 110.

GPS receiver 102 receives information indicating a position of this GPS receiver 102 from an artificial satellite that includes a GPS satellite. To be more specific, GPS receiver 102 detects a current position of unmanned aircraft 100. GPS receiver 102 sequentially outputs the detected current position of unmanned aircraft 100 to processor 101 or a storage that is not shown.

Acceleration sensor 103 detects an acceleration of unmanned aircraft 100 for each of three different directions.

Gyroscope sensor 104 detects an angular speed for each rotation about three axes along the three different directions of unmanned aircraft 100.

Each of microphones 105 is directional and has a property of being able to pick up higher-quality sound within a sound pickup area having a predetermined angular range with respect to a specific direction than within an angular range outside the sound pickup area.

Each of microphones 105 is an example of a sensor. The predetermined angular range is 90 degrees or less for example, and is a three-dimensional angular range extending from a position of directional microphone 105. Each of microphones 105 may be a microphone array including a plurality of microphone elements. Each of microphones 105 picks up sound to sequentially generate sound data and then sequentially outputs the generated sound data to processor 101 or a storage that is not shown. When receiving the sound data, the storage sequentially stores the sound data received. Here, the storage may store the sound data in association with time information indicating a current time of day, for example.

Gimbal 106 is a device that keeps a triaxial attitude of camera 107 constant. More specifically, even if the attitude of unmanned aircraft 100 changes, gimbal 106 maintains a desirable attitude of camera 107 with respect to, for example, a terrestrial coordinate system. Here, the desirable attitude may be defined by an imaging direction of camera 107 that is included in the operation signal received from controller 200.

Camera 107 is a device that includes an optical system, such as a lens, and the image sensor. Camera 107 is an example of the sensor. Camera 107 captures an image to sequentially generate image data and sequentially outputs the generated image data to processor 101 or a storage. When receiving the image data, the storage sequentially stores the image data received. Here, the storage may store the image data in association with time information indicating a current time of day, for example.

Ranging sensor 108 detects a distance between ranging sensor 108 and a near subject. For example, ranging sensor 108 is an ultrasonic sensor, a time-of-flight (TOF) camera, or a light detection and ranging (LIDAR) sensor. Ranging data generated by ranging sensor 108 may be data in which a direction with respect to ranging sensor 108 is associated with a distance measured to the near subject in this direction. Ranging sensor 108 is fixed at a predetermined position of unmanned aircraft 100. On this account, a positional relationship between this predetermined position and a reference position of unmanned aircraft 100, such as the center of main body 140 of unmanned aircraft 100, is fixed. Thus, a detection result given by ranging sensor 108 allows unmanned aircraft 100 to calculate a positional relationship between the reference position of unmanned aircraft 100 and the near subject. Ranging sensor 108 is an example of the sensor. Ranging sensor 108 performs distance measurement to sequentially generate ranging data, and sequentially outputs the generated ranging data to processor 101 or a storage. When receiving the ranging data, the storage sequentially stores the received ranging data. Here, the storage may sequentially store the ranging data in association with time information indicating a current time of day, for example. Note that unmanned aircraft 100 may include a plurality of ranging sensors 108 located on different places of unmanned aircraft 100. The plurality of ranging sensors 108 are capable of detecting distances from unmanned aircraft 100 to subjects present in different directions.

Communication IF 109 is a communication interface that communicates with controller 200 or mobile terminal 300. Communication IF 109 includes a communication interface for receiving a transmission signal from controller 200, for example. Communication IF 109 may be a communication interface to wirelessly communicate with mobile terminal 300, or more specifically, may be a wireless local area network (LAN) interface that meets IEEE 802.11a, 11b, 11g, 11n, 11ac, and 11ax standards, for example.

Four generators 110 are described above, and thus detailed description is omitted here.

Processor 101 includes functional components including sound pickup processor 101a, quality determiner 101b, sound source determiner 101c, position detector 101d, flight controller 101e, video controller 101f, and obstruction detector 101g. Note that each of processors 101a to 101g sequentially performs a corresponding process using detection data sequentially detected by the various sensors and a result of the process sequentially performed by a corresponding processor. Then, the processor sequentially outputs the obtained process result to a predetermined destination.

Sound pickup processor 101a obtains four pieces of sound data generated through sound pickup by four microphones 105, and performs predetermined sound processing on each of the obtained four pieces of sound data. Sound pickup processor 101a includes noise processor 101aa and noise level calculator 101ab. Noise processor 101aa performs a sound source separation process to separate the obtained sound data into a target sound and a noise, which is related to flight of unmanned aircraft 100. The noise associated with unmanned aircraft 100 (hereinafter, simply referred to as the noise) refers to a noise caused when generator 110 of unmanned aircraft 100 is actuated, for example. Noise processor 101aa extracts the noise or the target sound by applying a directional filter, which is used for obtaining directivity in any direction, to an audio signal obtained from each of the plurality of microphone elements included in each of microphones 105. As a result, the noise is separated from the target sound. Following this, noise level calculator 101ab calculates a sound pressure level of the noise separated by noise processor 101aa and a sound pressure level of the target sound separated by noise processor 101aa. As a result, sound pickup processor 101a extracts the noise and the target sound for each of the four pieces of sound data generated through sound pickup by four microphones 105. Note that noise level calculator 101ab may reduce noise included in the sound data by performing predetermined sound processing through filtering a sound component in a predetermined frequency band. The sound component in the predetermined frequency band is in a frequency band of noise caused by rotation of rotor 111 of generator 110, for example.

Quality determiner 101b determines whether quality of the target sound is higher or lower than a predetermined goal quality, using the sound pressure level of the noise and the sound pressure level of the target sound obtained by sound pickup processor 101a. More specifically, quality determiner 101b calculates an S/N ratio of the target sound to the noise as an indicator for determining the quality of the target sound, using the sound pressure level of the noise and the sound pressure level of the target sound. Quality determiner 101b obtains a goal S/N ratio that is calculated using the S/N ratio calculated using the target sound and the noise, as a predetermined goal quality. Then, quality determiner 101b determines the quality of the target sound by comparing the obtained goal S/N ratio and the calculated S/N ratio. Here, the goal S/N ratio may be in a range of S/N ratio with respect to a reference S/N ratio. For example, the goal S/N ratio may be within a range of plus or minus 1 with respect to the reference S/N ratio. Note that the goal S/N ratio may be previously stored in a memory or storage that is not shown, or in an external device. To be more specific, quality determiner 101b may obtain the goal S/N ratio by reading from the memory or storage that is not shown, or from the external device via communication IF 109.

Quality determiner 101b determines whether the S/N ratio is higher or lower than the goal S/N ratio. If the S/N ratio is higher than the goal S/N ratio, or more specifically, if the S/N ratio is higher than an upper limit of the range of the goal S/N ratio, quality determiner 101b determines that the quality is high. If the S/N ratio is lower than the goal S/N ratio, or more specifically, if the S/N ratio is lower than a lower limit of the range of the goal S/N ratio, quality determiner 101b determines that the quality is low. Quality determiner 101b may determine the quality of the target sound for the sound data having the highest sound pressure level obtained by sound pickup processor 101a, among the four pieces of sound data obtained from four microphones 105. Thus, quality determiner 101b may not determine the quality of the target sounds for the other pieces of sound data.

Sound source determiner 101c obtains a positional relationship between unmanned aircraft 100 and a sound source of the target sound (hereinafter, simply referred to as the "sound source"), using at least one of: the sound data outputted from four microphones 105; the image data outputted from camera 107; or the ranging data outputted from ranging sensor 108. Sound source determiner 101c outputs the obtained positional relationship to flight controller 101e.

Suppose that the positional relationship is obtained using the sound data generated by four microphones 105. In this case, sound source determiner 101c uses the sound data to determine, as the positional relationship, at least one of (i) a sound source direction of a sound source with respect to unmanned aircraft 100; (ii) a position of the sound source with respect to unmanned aircraft 100; or (iii) a distance to the sound source with respect to unmanned aircraft 100. The sound source direction of the sound source with respect to unmanned aircraft 100 refers to a direction from unmanned aircraft 100 toward the sound source. The position of the sound source with respect to unmanned aircraft 100 refers to a relative position of the sound source with respect to unmanned aircraft 100. The distance to the sound source with respect to unmanned aircraft 100 refers to a distance measured from unmanned aircraft 100 to the sound source. In this way, sound source determiner 101c obtains each of these determination results as the positional relationship between unmanned aircraft 100 and the sound source.

For example, sound source determiner 101c may compare the four pieces of sound data obtained from four microphones 105 and determine, as being the sound source direction, a direction in which the sound pressure of the target sound is estimated to be greater. Sound source determiner 101c may compare a plurality of pieces of data that are obtained from the plurality of microphone elements of microphone 105 and included in each of the four pieces of sound data obtained from four microphones 105. Then, sound source determiner 101c may determine, as being the sound source direction, a direction in which the sound pressure of the target sound is estimated to be greater. Moreover, sound source determiner 101c may obtain loudness of the target sound emitted from the sound source. Then, sound source determiner 101c may estimate a distance to the sound source by comparing the obtained loudness of the target sound with the sound pressures of the target sound included in the sound data generated by four microphones 105. In this case, the loudness of the target sound from the sound source may be predetermined for estimation of the distance to the sound source. Furthermore, sound source determiner 101c may estimate the relative position of the sound source with respect to unmanned aircraft 100, using the determined sound source direction and the distance to the sound source.

Suppose that the positional relationship is obtained using the image data generated by the image sensor of camera 107. In this case, sound source determiner 101c uses the image data to determine at least one of (i) the sound source direction of the sound source with respect to unmanned aircraft 100; (ii) the position of the sound source with respect to unmanned aircraft 100; or (iii) the distance to the sound source with respect to unmanned aircraft 100. In this way, sound source determiner 101c obtains each of these determination results as the positional relationship between unmanned aircraft 100 and the sound source. For example, sound source determiner 101c may determine at least one of the position of the sound source, the distance to the sound source, or the sound source direction, by recognizing a color, shape, or type of the sound source that is predetermined through image processing performed on the image data.

Suppose that the positional relationship is obtained using the ranging data generated by ranging sensor 108. In this case, sound source determiner 101c uses the ranging data to determine at least one of (i) the sound source direction of the sound source with respect to unmanned aircraft 100; (ii) the position of the sound source with respect to unmanned aircraft 100; or (iii) the distance to the sound source with respect to unmanned aircraft 100. In this way, sound source determiner 101c obtains each of these determination results as the positional relationship between unmanned aircraft 100 and the sound source. For example, sound source determiner 101c may construct a three-dimensional model using the ranging data. Then, sound source determiner 101c may determine at least one of the position of the sound source, the distance to the sound source, or the sound source direction, by recognizing a three-dimensional geometry of the sound source from the constructed three-dimensional model.

Suppose that the sound source direction is determined using the sound data or the image data. In this case, sound source determiner 101c may obtain a distance to a subject present in the sound source direction determined from the ranging data, and then estimate the relative position of the sound source with respect to unmanned aircraft 100. In this way, sound source determiner 101c may determine a relative positional relationship between unmanned aircraft 100 and the sound source, by determining the sound source direction and the distance from unmanned aircraft 100 to the sound source using the data generated by the sensors.

Moreover, sound source determiner 101c may obtain position information of the sound source from the sound source. Then, sound source determiner 101c may use this information to determine the sound source direction with respect to unmanned aircraft 100 or the relative position of the sound source with respect to unmanned aircraft 100.

The sound source may be a person, a speaker, or a vehicle, for example.

Position detector 101d obtains a detection result given by GPS receiver 102 and detects a current position of unmanned aircraft 100.

Flight controller 101e controls a flight state of unmanned aircraft 100 by controlling the number of revolutions of actuator 112 of generator 110, in accordance with the current position of unmanned aircraft 100 detected by position detector 101d, a flight speed and a flight attitude of unmanned aircraft 100 obtained from the detection results given by acceleration sensor 103 and gyroscope sensor 104, and the operation signal received from controller 200 via communication IF 109. More specifically, flight controller 101e performs normal control to control the flight state of unmanned aircraft 100 according to an operation performed on controller 200 by the user.

Moreover, flight controller 101e performs sound recording control separately from the normal control. In the sound recording control, flight controller 101e controls movement of unmanned aircraft 100 to control a distance between unmanned aircraft 100 and the sound source, in accordance with the quality of the target sound determined by quality determiner 101b and the positional relationship between unmanned aircraft 100 and the sound source determined by sound source determiner 101c.

If quality determiner 101b determines that the quality of the target sound is lower than the goal quality, flight controller 101e controls the movement of unmanned aircraft 100 for flight-state control in the sound recording control so that unmanned aircraft 100 moves away from the sound source, for example. As a result, unmanned aircraft 100 flies in a direction away from the sound source.

When controlling the movement of unmanned aircraft 100 so that unmanned aircraft 100 moves away from the sound source, flight controller 101e performs control to move unmanned aircraft 100 to any position between the current position of unmanned aircraft 100 detected by position detector 101d and a position at which the quality of the target sound reaches the goal quality. In this case, flight controller 101e may determine, as a goal distance, a distance between the sound source and the position at which the quality of the target sound reaches the goal quality, for example. Then, flight controller 101e may control the movement of unmanned aircraft 100 so that the distance between unmanned aircraft 100 and the sound source reaches the goal distance.

Flight controller 101e calculates the goal distance between the sound source and the position at which the quality of the target sound reaches the goal quality, using the distance between the current position of unmanned aircraft 100 and the sound source, the quality of the target sound from the sound source, and the relationship between a predetermined sound pressure level and the distance from the sound source. Then, flight controller 101e controls the movement of unmanned aircraft 100 so that unmanned aircraft 100 is located at the goal distance measured from the sound source. Thus, when flying in the direction away from the sound source, unmanned aircraft 100 flies to the position at which the quality of the target sound reaches the goal quality and stays at this position not to move farther from the sound source, for example.

If quality determiner 101b determines that the quality of the target sound is higher than the goal quality, flight controller 101e controls the movement of unmanned aircraft 100 for flight-state control in the sound recording control so that unmanned aircraft 100 approaches the sound source, for example. As a result, unmanned aircraft 100 flies in a direction to approach the sound source.

When controlling the movement of unmanned aircraft 100 so that unmanned aircraft 100 approaches the sound source, flight controller 101e performs control so that unmanned aircraft 100 does not approach any closer to the sound source than a position at a predetermined distance from the sound source, in accordance with: distance information instructing unmanned aircraft 100 not to approach any closer to the sound source than the position at the predetermined distance from the sound source; and the positional relationship obtained by sound source determiner 101c. Thus, when flying in the direction to approach the sound source, unmanned aircraft 100 flies, to approach the sound source, to the position at the predetermined distance from the sound source and does not approach any closer to the sound source than this position, for example.

Note that the distance information may be previously stored in a memory or storage that is not shown, or in an external device. To be more specific, flight controller 101e may obtain the distance information by reading from the memory or storage that is not shown, or from the external device via communication IF 109.

Flight controller 101e may perform the sound recording control when four microphones 105 pick up the target sound. When four microphones 105 starts the target sound pickup, flight controller 101e may stop the normal control to start the sound recording control. Then, after the end of the target sound pickup, flight controller 102e may stop the sound recording control to start the normal control.

The sound recording control may be performed when four microphones 105 pick up the target sound. More specifically, the sound recording control may be performed when only the target sound pickup is performed or when the image capture by camera 107 and the target sound pickup are both performed.

Video controller 101f controls gimbal 106 according to the operation signal received by communication IF 109. By doing so, video controller 101f controls the attitude of camera 107 so that the imaging direction of camera 107 is oriented in a direction indicated by the operation signal. Moreover, video controller 101f may perform predetermined image processing on image data captured by camera 107. Video controller 101f may transmit the image data obtained from camera 107 or image data obtained as a result of the predetermined image processing to mobile terminal 300 via communication IF 109.

Obstruction detector 101g detects an obstruction around unmanned aircraft 100 according to the distance from unmanned aircraft 100 to a subject that is detected by ranging sensor 108. Obstruction detector 101g may detect an obstruction present in a direction in which unmanned aircraft 100 proceeds, by exchanging information with flight controller 101e. If detecting an obstruction present in the direction in which unmanned aircraft 100 proceeds, obstruction detector 101g may instruct flight controller 101e to move unmanned aircraft 100 to avoid the obstruction.

[2. Operation]

Next, an operation performed by unmanned aircraft 100 according to the embodiment is described.

Figure 5:
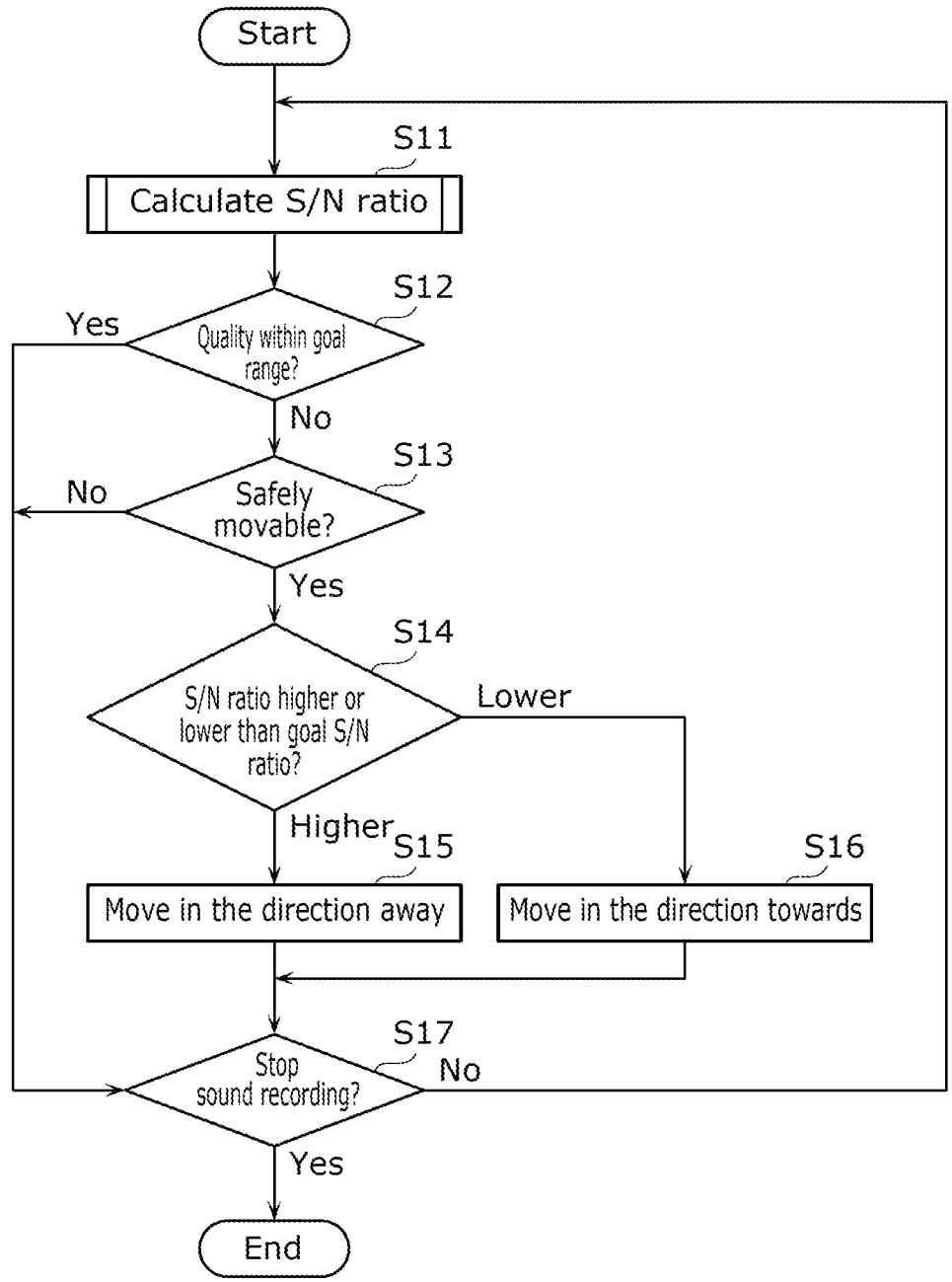
FIG. 5 is a flowchart illustrating an example of an operation performed for sound recording control of the unmanned aircraft according to the embodiment.
Figure 6:
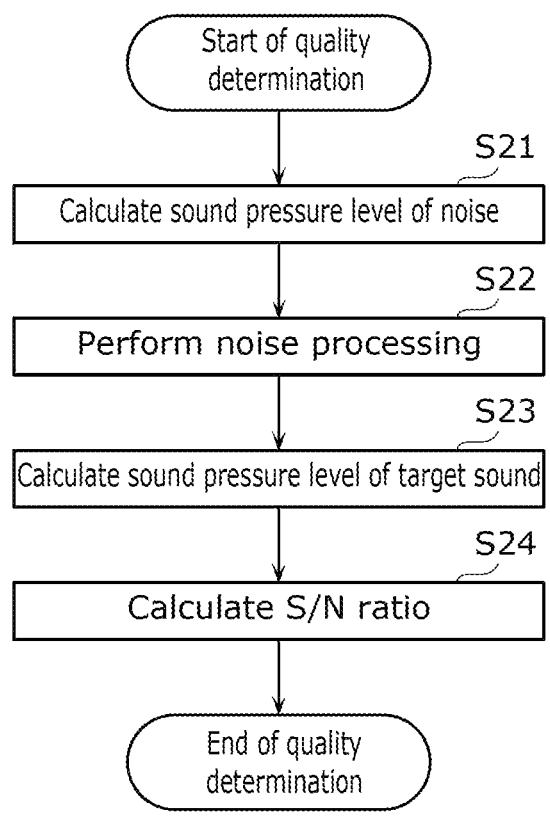
FIG. 6 is a flowchart illustrating an example of a process performed by the unmanned aircraft to determine quality of a target sound.
Figure 7:
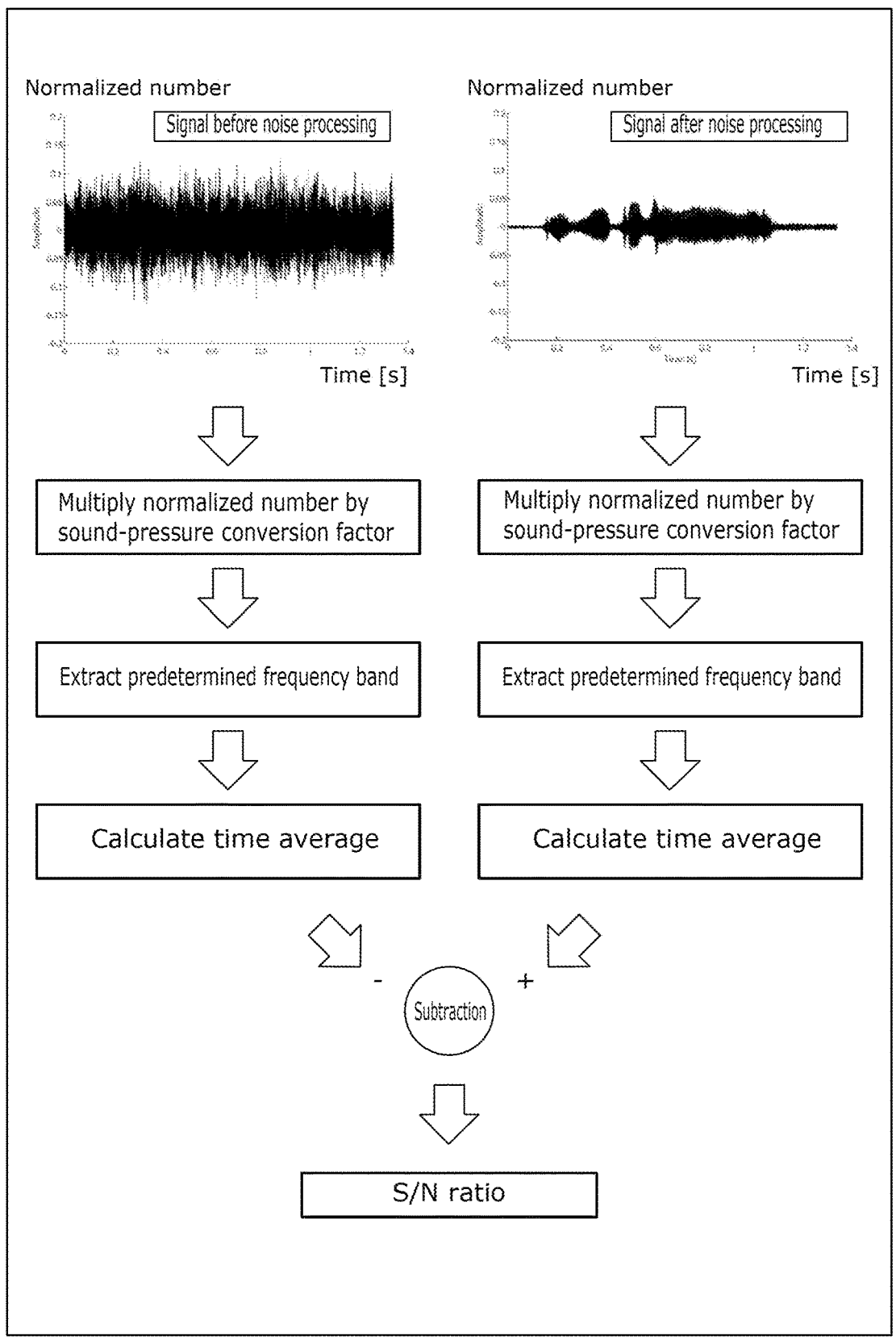
FIG. 7 illustrates an example of a method of calculating a signal-to-noise (S/N) ratio as an indicator of the quality of the target sound.

FIG. 5 is a flowchart illustrating an example of an operation performed for sound recording control of the unmanned aircraft according to the embodiment. FIG. 6 is a flowchart illustrating an example of a process performed by the unmanned aircraft to determine quality of a target sound. FIG. 7 illustrates an example of a method of calculating an S/N ratio as an indicator of the quality of the target sound.

As illustrated in FIG. 5, when sound-pickup processor 101a starts the sound recording control, quality determiner 101b of unmanned aircraft 100 determines quality of the target sounds included in the four pieces of sound data generated by four microphones 105 (S11). For example, when the operation signal received from controller 200 includes a signal indicating a start of sound recording, sound pickup processor 101a starts sound recording. The process performed in step S11 to determine the quality of the target sound is described in detail, with reference to FIG. 6 and FIG. 7.

As illustrated in FIG. 6, noise level calculator 101ab of sound pickup processor 101a calculates a sound pressure level of unprocessed sound signal (including noise) for each of the four pieces of sound data generated by four microphones 105 (S21). For example, noise level calculator 101ab obtains a signal before noise processing as illustrated in FIG. 7, as the sound data from microphone 105. The signal before noise processing is represented by a temporal change of a normalized number, for example. Thus, noise level calculator 101ab calculates a temporal change of the sound pressure level by multiplying amplitude of the signal before noise processing by a sound-pressure conversion factor corresponding to performance of corresponding microphone 105. Noise level calculator 101ab extracts a predetermined frequency band from the calculated temporal change of the sound pressure. Then, noise level calculator 101ab calculates the sound pressure level of the noise by calculating an average sound pressure level in a predetermined time duration (such as one second) from the temporal change of the sound pressure level in the extracted predetermined frequency band. Note that the predetermined frequency band is predetermined to extract the target sound.

Noise level calculator 101ab calculates the sound pressure level of the noise using the signal before noise processing that is obtained from microphone 105. However, this is not intended to be limiting. Noise level calculator 101ab may obtain, from a storage, a sound pressure level calculated using a signal obtained by previously picking up noise when no target sound is produced. In this case, the sound pressure level calculated using the previously-obtained signal is calculated using a signal obtained through sound recording performed corresponding to the number of revolutions of generator 110 of unmanned aircraft 100 for each different stage. This sound pressure level is associated with the corresponding number of revolutions. More specifically, noise level calculator 101ab may obtain the sound pressure level of the noise by reading, from the storage, the sound pressure level associated with the number of revolutions of generator 110 of unmanned aircraft 100.

Next, noise processor 101aa of sound pickup processor 101a performs, as the noise processing, the sound source separation process to separate the obtained sound data into the target sound and the noise, which is related to flight of unmanned aircraft 100 (S22). As a result, a signal after noise processing is obtained as illustrated in FIG. 7.

Next, noise level calculator 101ab calculates a sound pressure level of the separated target sound (S23). As with the signal before noise processing, the signal after noise processing is represented by a temporal change of a normalized number, for example. Thus, noise level calculator 101ab calculates a temporal change of the sound pressure level by multiplying amplitude of the signal after noise processing by a sound-pressure conversion factor corresponding to performance of corresponding microphone 105. Noise level calculator 101ab extracts a predetermined frequency band from the calculated temporal change of the sound pressure. Then, noise level calculator 101ab calculates the sound pressure level of the noise by calculating an average sound pressure level in a predetermined time duration (such as one second) from the temporal change of the sound pressure level in the extracted predetermined frequency band. Moreover, noise level calculator 101ab may calculate the predetermined time duration used for calculating the average sound pressure level, using characteristics of the detected target sound. More specifically, the predetermined time duration may be adjusted according to the characteristics of the detected target sound. Here, examples of such characteristics include a frequency band of the detected target sound and a time length of the detected target sound. For example, noise level calculator 101ab may increase the predetermined time duration by determining whether the frequency band of the detected target sound is within a predetermined frequency band. Alternatively, noise level calculator 101ab may decrease the predetermined time duration with decrease in the time length of the detected target sound.

Quality determiner 101b calculates the S/N ratio of the target sound to the noise, by subtracting the sound pressure level of the noise from the sound pressure level of the target sound using the sound pressure level of the noise and the sound pressure level of the target sound calculated by noise level calculator 101ab (S24).

Next, quality determiner 101b determines whether the calculated S/N ratio is the goal S/N ratio (S12). To be more specific, quality determiner 101b determines whether the calculated S/N ratio is within a range of S/N ratio with respect to the reference S/N ratio. Hereinafter, a range could be defined as +−5 dB, for example.

If quality determiner 101b determines that the calculated S/N ratio is not the goal S/N ratio (No in S12), the process proceeds to step S13. In contrast, if quality determiner 101b determines that the calculated S/N ratio is the goal S/N ratio (Yes in S12), the process proceeds to step S17. If the S/N ratio is the goal S/N ratio, this means that unmanned aircraft 100 collects the target sound favorably. Thus, unmanned aircraft 100 is not moved.

Next, obstruction detector 101g determines whether unmanned aircraft 100 is safely movable (S13). More specifically, obstruction detector 101g determines whether a subject is present near unmanned aircraft 100. If determining that no subject is present near unmanned aircraft 100, obstruction detector 101g determines that unmanned aircraft 100 is safely movable. If determining that a subject is present near unmanned aircraft 100, obstruction detector 101g determines that unmanned aircraft 100 is not safely movable.

If obstruction detector 101g determines that unmanned aircraft 100 is safely movable (Yes in S13), the process proceeds to Step S14. In contrast, if obstruction detector 101g determines that unmanned aircraft 100 is not safely movable (No in S13), the process proceeds to step S17.

Quality determiner 101b determines whether the calculated S/N ratio is higher or lower than the goal S/N ratio (S14). In the present example, quality determiner 101b determines whether the calculated S/N ratio is higher or lower than the goal S/N ratio, using the range of plus or minus 1 with respect to the reference S/N ratio (−10 dB, for example). To be more specific, quality determiner 101b determines whether the calculated S/N ratio is higher than an upper limit (−9 dB, for example) of the range of the goal S/N ratio or lower than a lower limit (−11 dB, for example) of the range of the goal S/N ratio.

If quality determiner 101b determines that the calculated S/N ratio is higher than the range of the goal S/N ratio ("Higher" in S14), flight controller 101e performs control to move unmanned aircraft 100 in the direction away from the sound source (S15).

If quality determiner 101b determines that the calculated S/N ratio is lower than the range of the goal S/N ratio ("Lower" in S14), flight controller 101e performs control to move unmanned aircraft 100 in the direction to approach the sound source (S16).

Sound pickup processor 101a determines whether to stop sound recording (S17). If sound pickup processor 101a determines to stop sound recording (Yes in S17), the sound recording control is ended. If sound pickup processor 101a determines not to stop sound recording (No in S17), quality determiner 101b makes the determination in step S11 again.

Figure 8A:
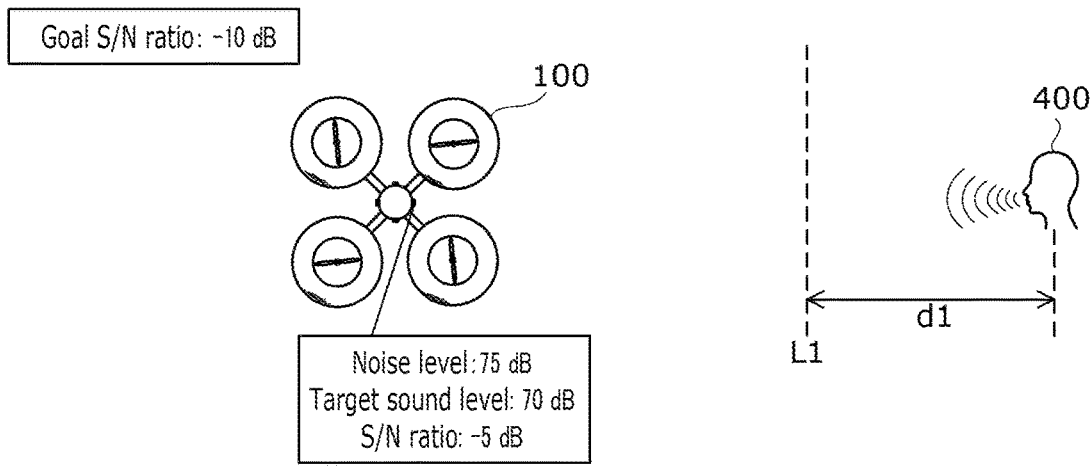
FIG. 8A illustrates a first situation as an example of the operation performed for sound recording control of the unmanned aircraft according to the embodiment.
Figure 8B:
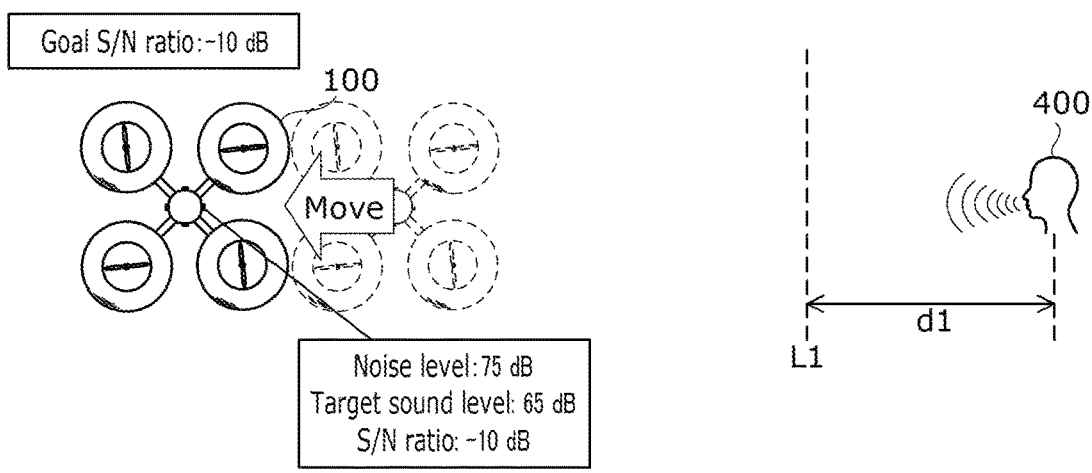
FIG. 8B illustrates a second situation as an example of the operation performed for sound recording control of the unmanned aircraft according to the embodiment.
Figure 8C:
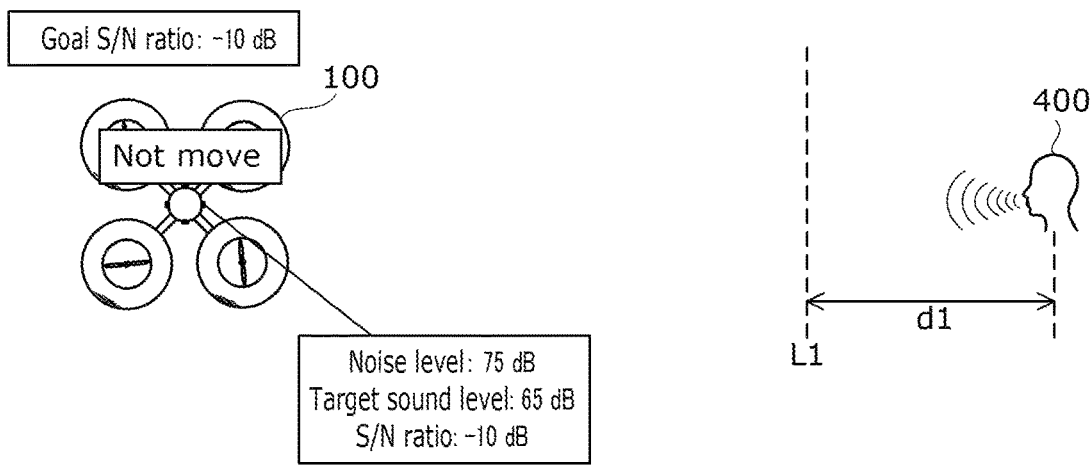
FIG. 8C illustrates a third situation as an example of the operation performed for sound recording control of the unmanned aircraft according to the embodiment.
Figure 9A:
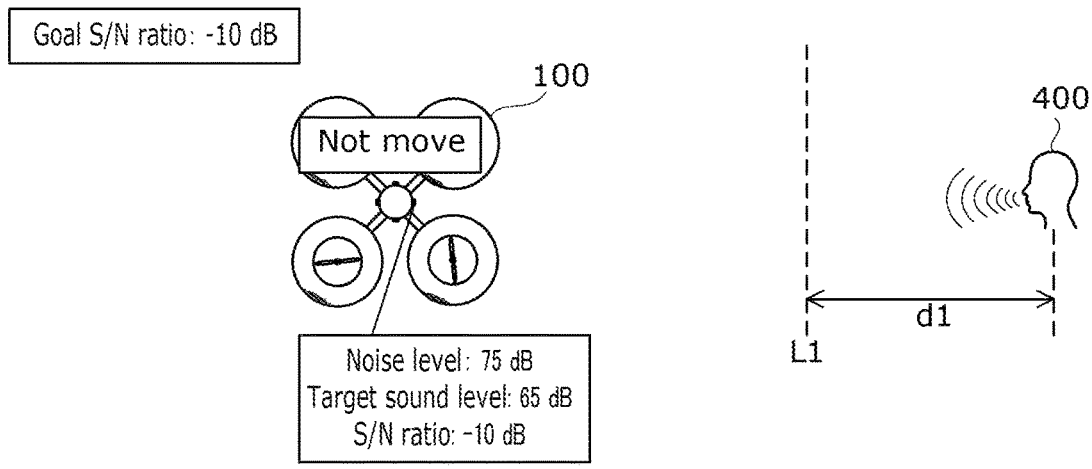
FIG. 9A illustrates a fourth situation as an example of the operation performed for sound recording control of the unmanned aircraft according to the embodiment.
Figure 9B:
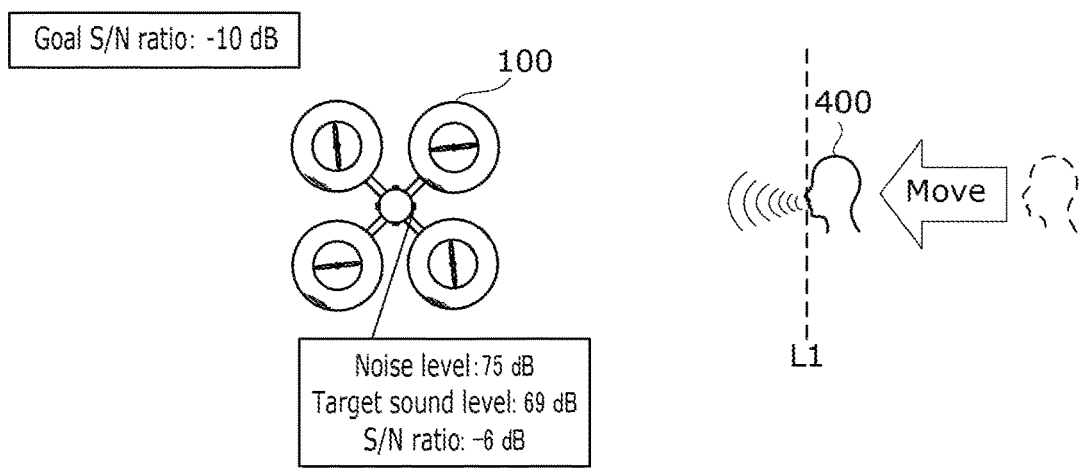
FIG. 9B illustrates a fifth situation as an example of the operation performed for sound recording control of the unmanned aircraft according to the embodiment.
Figure 9C:
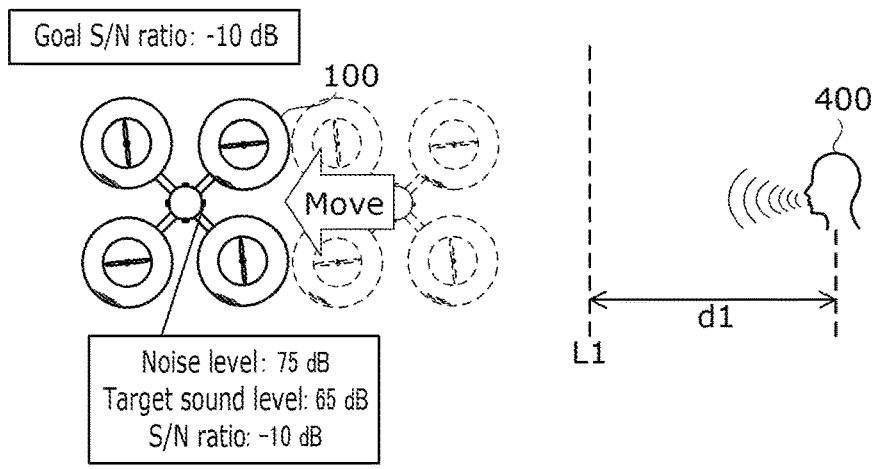
FIG. 9C illustrates a sixth situation as an example of the operation performed for sound recording control of the unmanned aircraft according to the embodiment.
Figure 10A:
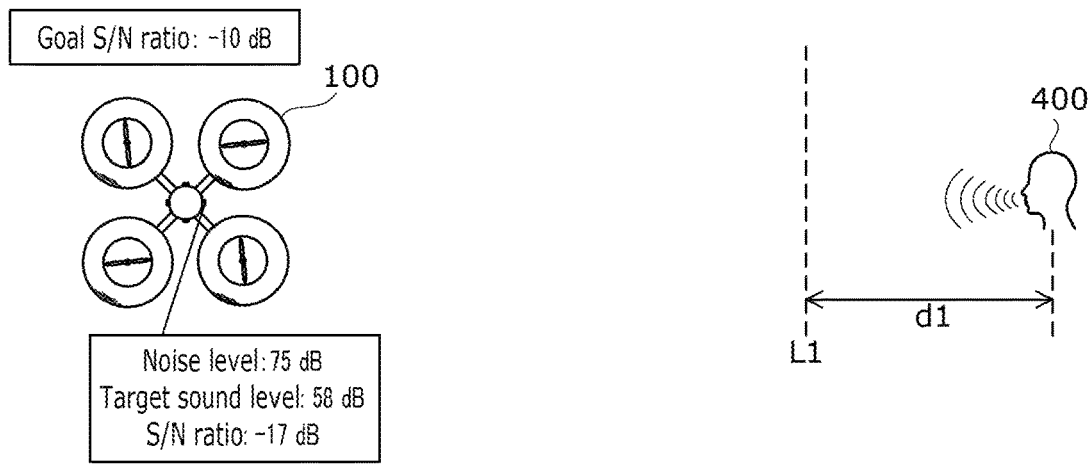
FIG. 10A illustrates a seventh situation as an example of the operation performed for sound recording control of the unmanned aircraft according to the embodiment.
Figure 10B:
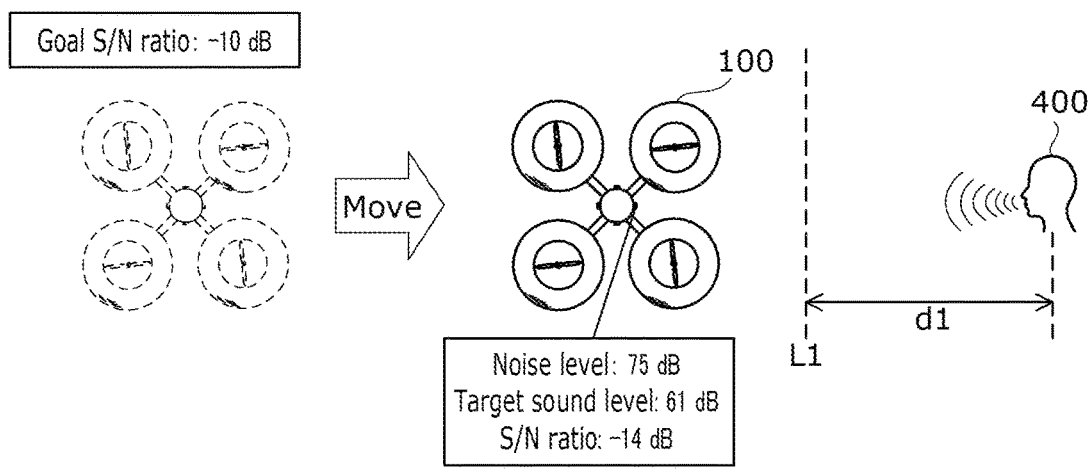
FIG. 10B illustrates an eighth situation as an example of the operation performed for sound recording control of the unmanned aircraft according to the embodiment.
Figure 10C:
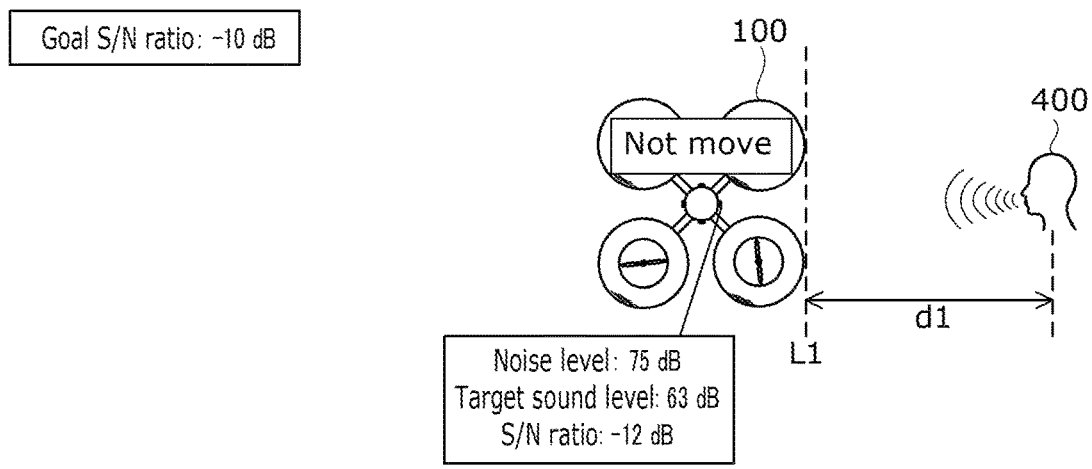
FIG. 10C illustrates a ninth situation as an example of the operation performed for sound recording control of the unmanned aircraft according to the embodiment.

FIG. 8A illustrates a first situation as an example of the operation for sound recording control of the unmanned aircraft according to the embodiment. FIG. 8B illustrates a second situation as an example of the operation performed for sound recording control of the unmanned aircraft according to the embodiment. FIG. 8C illustrates a third situation as an example of the operation performed for sound recording control of the unmanned aircraft according to the embodiment. FIG. 9A illustrates a fourth situation as an example of the operation performed for sound recording control of the unmanned aircraft according to the embodiment. FIG. 9B illustrates a fifth situation as an example of the operation performed for sound recording control of the unmanned aircraft according to the embodiment. FIG. 9C illustrates a sixth situation as an example of the operation performed for sound recording control of the unmanned aircraft according to the embodiment. FIG. 10A illustrates a seventh situation as an example of the operation performed for sound recording control of the unmanned aircraft according to the embodiment. FIG. 10B illustrates an eighth situation as an example of the operation performed for sound recording control of the unmanned aircraft according to the embodiment. FIG. 10C illustrates a ninth situation as an example of the operation performed for sound recording control of the unmanned aircraft according to the embodiment.

FIG. 8A to FIG. 8C, FIG. 9A to FIG. 9C, and FIG. 10A to FIG. 10C illustrate operations performed by unmanned aircraft 100 viewed from above. FIG. 8A to FIG. 8C, FIG. 9A to FIG. 9C, and FIG. 10A to FIG. 10C illustrate examples of the operation performed by unmanned aircraft 100 to pick up a target sound when sound source 400 is a person by whom the target sound is emitted. In the examples illustrated in FIG. 8A to FIG. 8C, FIG. 9A to FIG. 9C, and FIG. 10A to FIG. 10C, the reference S/N ratio is described as the goal S/N ratio. Broken line L illustrated in the examples in FIG. 8A to FIG. 8C, FIG. 9A to FIG. 9C, and FIG. 10A to FIG. 10C is an imaginary line indicating a position at predetermined distance d1 from sound source 400 that is indicated by the distance information. More specifically, broken line L1 indicates a boundary of a safety area to ensure the safety of the sound source.

In a situation illustrated in FIG. 8A, the sound pressure level of the noise is calculated at 75 dB and the sound pressure level of the target sound is calculated at 70 dB, from which the S/N ratio is calculated at −5 dB. Here, the goal S/N ratio is set at −10 dB, and the calculated S/N ratio is higher than the goal S/N ratio. Thus, unmanned aircraft 100 moves in the direction away from sound source 400 as illustrated in FIG. 8B. In a situation illustrated in FIG. 8B, unmanned aircraft 100 uses the sound data obtained from microphone 105 after moving away from sound source 400. As a result, the sound pressure level of the noise is calculated at 75 dB and the sound pressure level of the target sound is calculated at 70 dB, from which the S/N ratio is calculated at −10 dB as illustrated in FIG. 8B. In this case, the calculated S/N ratio is within the range of the goal S/N ratio. Thus, unmanned aircraft 100 does not move, and thus maintains a distance from sound source 400 as illustrated in FIG. 8C.

In a situation illustrated in FIG. 9A, the sound pressure level of the noise is calculated at 75 dB and the sound pressure level of the target sound is calculated at 65 dB, from which the S/N ratio is calculated at −10 dB. Here, the goal S/N ratio is set at −10 dB, and the calculated S/N ratio is within the range of the goal S/N ratio. Thus, unmanned aircraft 100 does not move, and thus maintains a distance from sound source 400 as illustrated in FIG. 9A. Next, FIG. 9B illustrates a situation in which sound source 400 approaches unmanned aircraft 100. In this case, unmanned aircraft 100 uses the sound data obtained from microphone 105 after sound source 400 approaches unmanned aircraft 100. As a result, the sound pressure level of the noise is calculated at 75 dB and the sound pressure level of the target sound is calculated at 69 dB, from which the S/N ratio is calculated at −6 dB. The calculated S/N ratio is higher than the goal S/N ratio. Thus, unmanned aircraft 100 moves in the direction away from sound source 400 as illustrated in FIG. 9C. In a situation illustrated in FIG. 9C, unmanned aircraft 100 uses the sound data obtained from microphone 105 after moving away from sound source 400. As a result, the sound pressure level of the noise is calculated at 75 dB and the sound pressure level of the target sound is calculated at 65 dB, from which the S/N ratio is calculated at −10 dB. In this case, the calculated S/N ratio is within the range of the goal S/N ratio. Thus, unmanned aircraft 100 does not move, and thus maintains a distance from sound source 400 as illustrated in FIG. 9C.

In a situation illustrated in FIG. 10A, the sound pressure level of the noise is calculated at 75 dB and the sound pressure level of the target sound is calculated at 58 dB, from which the S/N ratio is calculated at −17 dB. Here, the goal S/N ratio is set at −10 dB, and the calculated S/N ratio is lower than the goal S/N ratio. Thus, unmanned aircraft 100 moves in the direction to approach sound source 400 as illustrated in FIG. 10B. In a situation illustrated in FIG. 10B, unmanned aircraft 100 uses the sound data obtained after approaching sound source 400. As a result, the sound pressure level of the noise is calculated at 75 dB and the sound pressure level of the target sound is calculated at 61 dB, from which the S/N ratio is calculated at −14 dB. In this case, the calculated S/N ratio is still lower than the goal S/N ratio. Thus, unmanned aircraft 100 moves in the direction to further approach sound source 400 as illustrated in FIG. 10C. In a situation illustrated in FIG. 10C, unmanned aircraft 100 uses the sound data obtained after further approaching sound source 400. As a result, the sound pressure level of the noise is calculated at 75 dB and the sound pressure level of the target sound is calculated at 63 dB, from which the S/N ratio is calculated at −12 dB. In this case, the calculated S/N ratio is still lower than the goal S/N ratio. However, unmanned aircraft 100 is at predetermined distance d1 from sound source 400. Thus, unmanned aircraft 100 does not move any more in the direction to approach the sound source.

Although the positional relationship between unmanned aircraft 100 and sound source 400 is described above using the distance in a horizontal direction, a distance in a three-dimensional space may be used. In this case, the safety area, which is defined by predetermined distance d1 indicated by the distance information used for controlling unmanned aircraft 100 moving in the direction to approach sound source 400, may be defined by the distance in the three-dimensional space instead of the distance in the horizontal direction as described above as an example.

Figure 11A:
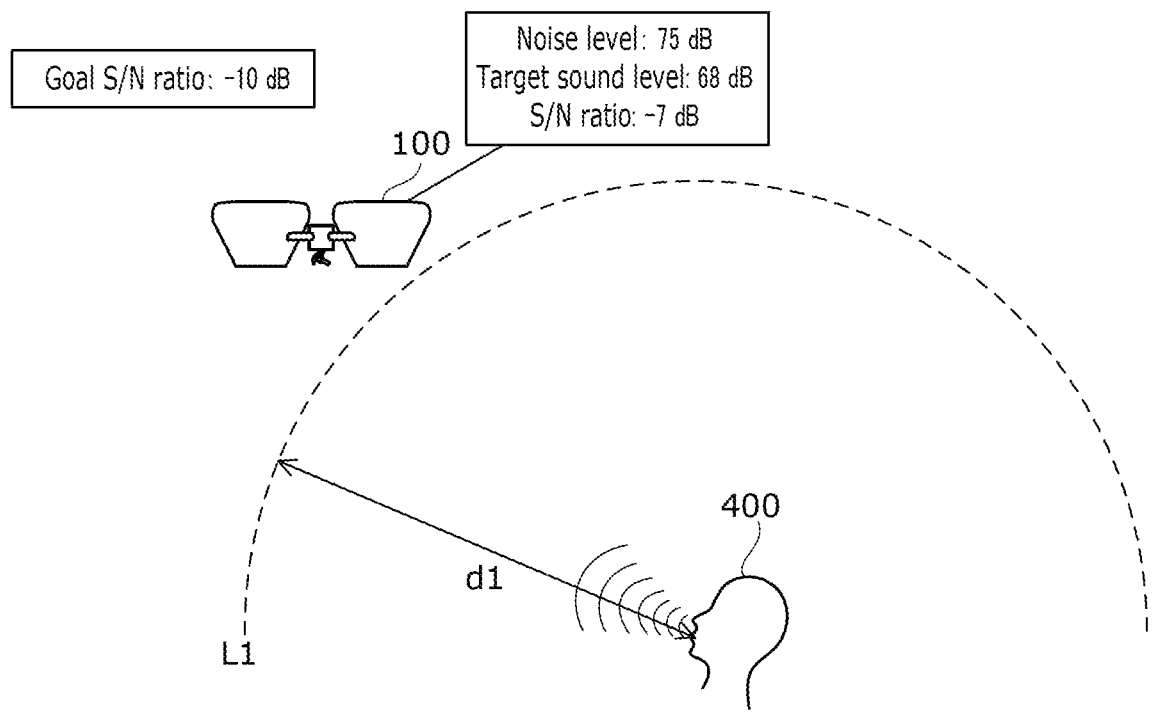
FIG. 11A illustrates a tenth situation as an example of the operation performed for sound recording control of the unmanned aircraft according to the embodiment.
Figure 11B:
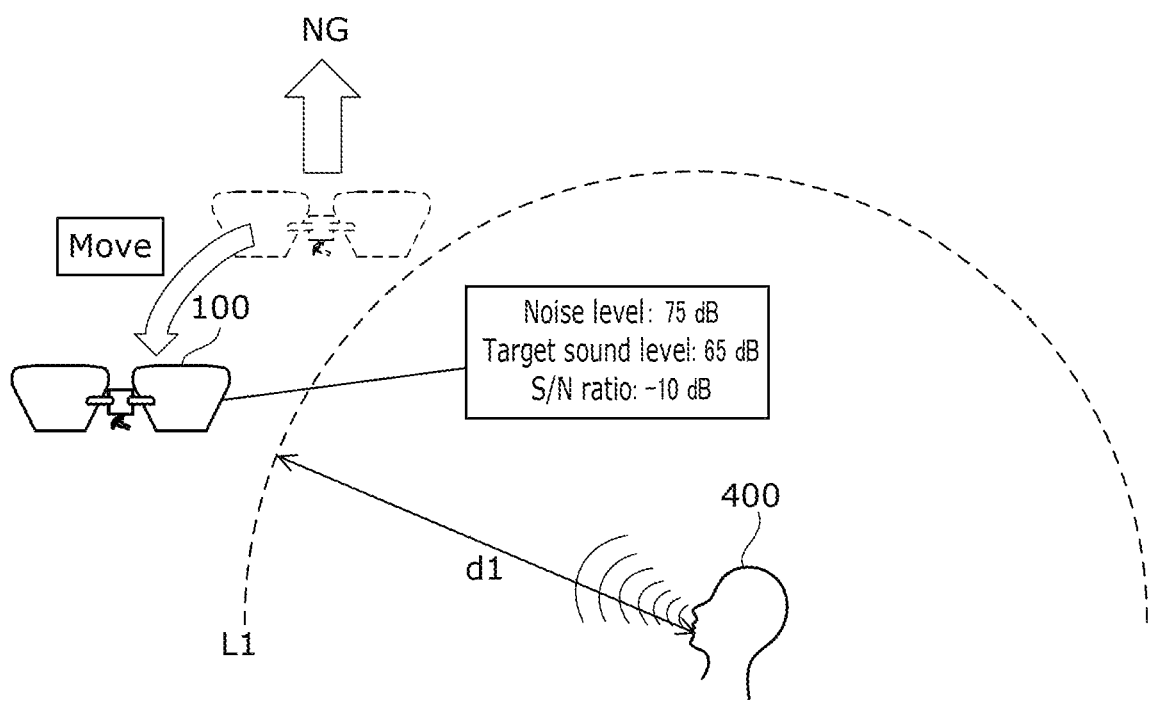
FIG. 11B illustrates an eleventh situation as an example of the operation performed for sound recording control of the unmanned aircraft according to the embodiment.
Figure 12A:
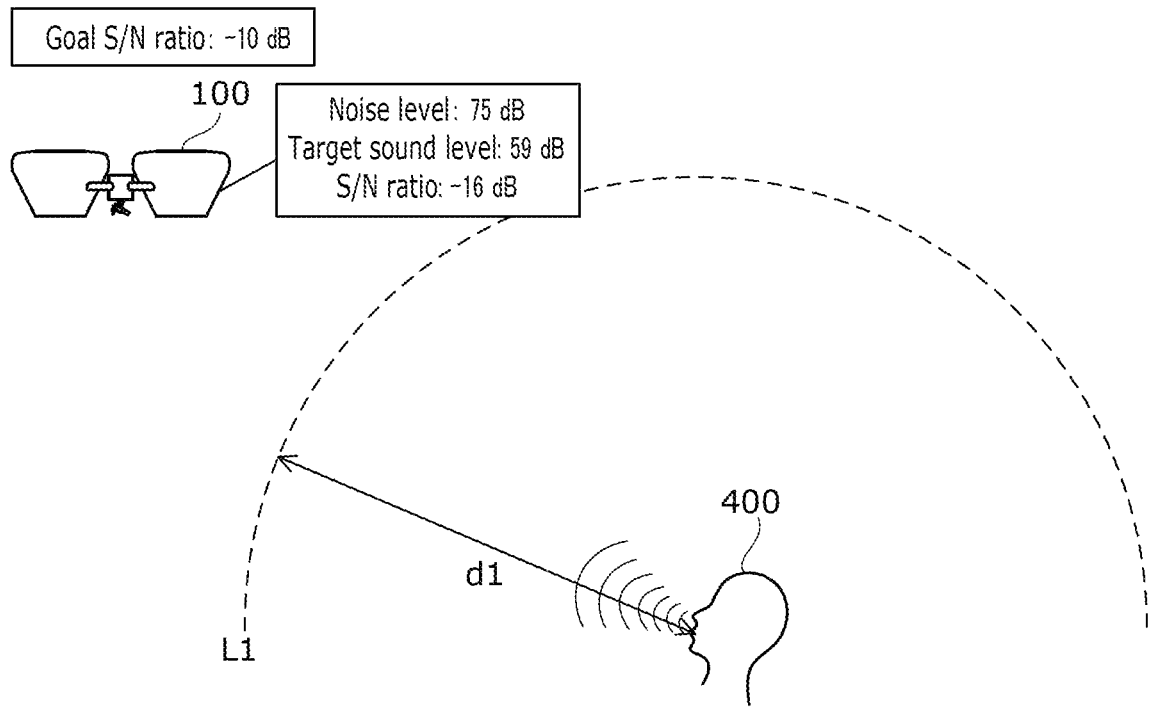
FIG. 12A illustrates a twelfth situation as an example of the operation performed for sound recording control of the unmanned aircraft according to the embodiment.
Figure 12B:
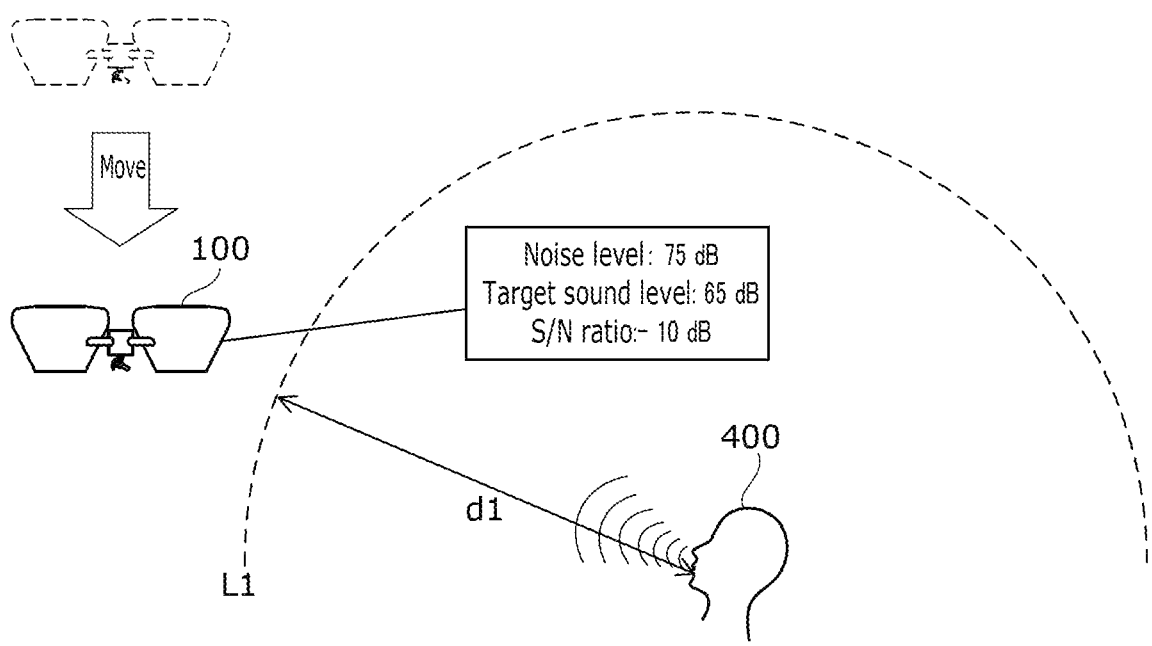
FIG. 12B illustrates a thirteenth situation as an example of the operation performed for sound recording control of the unmanned aircraft according to the embodiment.

FIG. 11A illustrates a tenth situation as an example of the operation for sound recording control of the unmanned aircraft according to the embodiment. FIG. 11B illustrates an eleventh situation as an example of the operation performed for sound recording control of the unmanned aircraft according to the embodiment. FIG. 12A illustrates a twelfth situation as an example of the operation performed for sound recording control of the unmanned aircraft according to the embodiment. FIG. 12B illustrates a thirteenth situation as an example of the operation performed for sound recording control of the unmanned aircraft according to the embodiment. Note that each of FIG. 11A, FIG. 11B, FIG. 12A, and FIG. 12B is an example illustrating the safety area and the positional relationship between the unmanned aircraft and the sound source viewed in the horizontal direction.

In a situation illustrated in FIG. 11A, the sound pressure level of the noise is calculated at 75 dB and the sound pressure level of the target sound is calculated at 68 dB, from which the S/N ratio is calculated at −7 dB. Here, the goal S/N ratio is set at −10 dB, and the calculated S/N ratio is higher than the goal S/N ratio. Thus, flight controller 101e performs control to move unmanned aircraft 100 in the direction away from sound source 400. When performing control to move unmanned aircraft 100 in the direction away from the sound source in this way, flight controller 101e may perform control to move unmanned aircraft 100 in the horizontal direction without control to cause unmanned aircraft 100 to ascend as illustrated in FIG. 11B. In this case, flight controller 101e may perform control to move unmanned aircraft 100 in a direction to further approach the ground.

As a result, when moving away from the sound source, unmanned aircraft 100 moves in the horizontal direction away from the sound source instead of ascending to move away from the sound source. Thus, unmanned aircraft 100 maintains a distance from the sound source in the horizontal direction. In this case, unmanned aircraft 100 does not move higher than the current position. Thus, an impact in case of falling of unmanned aircraft 100 can be reduced to ensure the safety of the sound source. In the above description, unmanned aircraft 100 moves in the direction away from the sound source as an example. However, even when unmanned aircraft 100 moves in the direction to approach the sound source, the same effect can be achieved.

In a situation illustrated in FIG. 12A, the sound pressure level of the noise is calculated at 75 dB and the sound pressure level of the target sound is calculated at 59 dB, from which the S/N ratio is calculated at −16 dB. Here, the goal S/N ratio is set at −10 dB, and the calculated S/N ratio is lower than the goal S/N ratio. Thus, flight controller 101e performs control to move unmanned aircraft 100 in the direction to approach sound source 400. When performing control to move unmanned aircraft 100 in the direction to approach the sound source in this way, flight controller 101e may perform control so that unmanned aircraft 100 approaches the ground as illustrated in FIG. 12B.

As a result, when approaching the sound source, unmanned aircraft 100 moves in the direction to approach the ground to approach the sound source instead of moving in the horizontal direction to approach the sound source. This allows unmanned aircraft 100 to approach the sound source while maintaining the distance from the sound source in the horizontal direction. In this way, unmanned aircraft 100 is closer to the ground than the current position is. Thus, an impact in case of falling of unmanned aircraft 100 can be reduced to ensure the safety of the sound source. In the above description, unmanned aircraft 100 moves in the direction to approach the sound source as an example. However, even when unmanned aircraft 100 moves in the direction away from the sound source, the same effect can be achieved.

[3. Advantageous Effects Etc.]

Processor 101 of unmanned aircraft 100 according to the present embodiment determines quality of a target sound using sound data generated by microphone 105. Processor 101 obtains a positional relationship between unmanned aircraft 100 and sound source 400 of the target sound using data generated by the sensor. Processor 101 controls movement of unmanned aircraft 100 to control a distance between unmanned aircraft 100 and sound source 400 of the target sound, in accordance with the quality of the target sound and the positional relationship. Thus, the quality of the target sound can be ensured while the distance between unmanned aircraft 100 and sound source 400 is controlled. This enables sound recording of appropriate sound quality in addition to ensuring safety of sound source 400.

When the quality of the target sound is higher than a predetermined goal quality, processor 101 of unmanned aircraft 100 controls the movement of unmanned aircraft 100 so that unmanned aircraft 100 moves away from sound source 400. In this way, unmanned aircraft 100 moves in the direction to away from sound source 400 when the quality of the target sound is ensured. This further enhances the safety of sound source 400.

When controlling the movement of unmanned aircraft 100 so that unmanned aircraft 100 moves away from sound source 400, processor 101 of unmanned aircraft 100 controls the movement of unmanned aircraft 100 so that unmanned aircraft 100 moves to any position between a current position of unmanned aircraft 100 and a position at which the quality of the target sound reaches the predetermined goal quality. Thus, unmanned aircraft 100 moves away from sound source 400 within an area to ensure the quality of the target sound.

When the quality of the target sound is lower than the predetermined goal quality, processor 101 of unmanned aircraft 100 controls the movement of unmanned aircraft 100 so that unmanned aircraft 100 approaches the sound source. In this way, unmanned aircraft 100 moves in the direction to approach sound source 400 when the quality of the target sound is not ensured. This enhances the quality of the target sound.

Processor 101 of unmanned aircraft 100 calculates a signal-to-noise (S/N) ratio using the target sound and noise related to flight of unmanned aircraft 100, as an indicator for determining the quality. Moreover, processor 101 further obtains, as the predetermined goal quality, a goal S/N ratio precalculated using the S/N ratio calculated using the target sound and the noise related to the flight of unmanned aircraft 100. Then, processor 101 determines the quality of the target sound by comparing the goal S/N ratio obtained and the S/N ratio calculated. This allows the quality of the target sound to be easily determined.

The sensor of unmanned aircraft 100 includes an image sensor that is included in camera 107 and that generates image data. Processor 101 obtains the positional relationship using the image data generated by the image sensor. In this way, processor 101 obtains the positional relationship additionally using the image data. Thus, the positional relationship with high precision can be obtained.

The sensor of unmanned aircraft 100 further includes ranging sensor 108 that generates ranging data. Processor 101 obtains the positional relationship using the ranging data generated by ranging sensor 108. In this way, the processor obtains the positional relationship additionally using the ranging data. Thus, the positional relationship with high precision can be obtained.

Processor 101 of unmanned aircraft 100 determines a goal distance in accordance with the quality of the target sound, the positional relationship, and the predetermined goal quality. Then, processor 101 controls the movement of unmanned aircraft 100 so that the distance between unmanned aircraft 100 and sound source 400 reaches the goal distance. As a result, unmanned aircraft 100 can move to the position corresponding to the predetermined goal quality.

[4. Variations]

[4-1. Variation 1]

For unmanned aircraft 100 according to the above embodiment, the reference S/N ratio for the goal S/N ratio used as the goal quality is described as one value, such as −10 dB. However, this is not limited to one value. More than one value may be set according to purposes of sound recording control.

FIG. 13 is a table illustrating an example of a relationship between the reference S/N ratio and the purpose. When the goal S/N ratio is represented by a threshold value instead of the goal range of plus or minus 1 dB, the reference S/N ratio may be understood as the goal S/N ratio.

As illustrated in FIG. 13, the reference S/N ratio may be set for each of four stages corresponding to purposes. In this table, R1 to R4 have a relationship expressed as R1<R2<R3<R4. For example, the reference S/N ratio for the lowest quality is R1, and the reference S/N ratio for typical sound collection is R2. The reference S/N ratio for relay broadcast is R3, and the reference S/N ratio for broadcast of high quality is R4. One of these purposes is selected through an operation performed on controller 200 by the user. Then, the reference S/N ratio corresponding to the selected purpose is used for the sound recording control of unmanned aircraft 100. The purpose may be fixed according to an application used by controller 200. In this case, the reference S/N ratio corresponding to the application is used for the sound recording control of unmanned aircraft 100.

[4-2. Variation 2]

Flight controller 101e of unmanned aircraft 100 according to the above embodiment performs control to move unmanned aircraft 100 in the direction away from the sound source if quality determiner 101b determines that the calculated S/N ratio is higher than the range of the goal S/N ratio. However, unmanned aircraft 100 may be controlled not to move in this case. This is because sound recording in this case is performed with sufficiently high quality.

[4-3. Variation 3]

When reaching the position at predetermined distance d1 from the sound source, unmanned aircraft 100 according to the above embodiment is controlled not to move even if the calculated S/N ratio is lower than the goal S/N ratio. However, further control may be performed in this case. To be more specific, if the quality of the target sound is lower than the predetermined goal quality after unmanned aircraft 100 is controlled to move, to approach the sound source, to the position at the predetermined distance from the sound source in accordance with the distance information and the positional relationship, unmanned aircraft 100 is controlled not to move. However, this is not intended to be limiting.

For example, if an actuator, which is not shown, is included in unmanned aircraft 100 to change an orientation of microphone 105, processor 101 may control the actuator to change the orientation of microphone 105. More specifically, a direction in which microphone 105 has a high sensitivity may be oriented toward the sound source. This aligns the high-sensitivity direction of microphone 105 with the direction of the sound source. Thus, the sound pressure level of the target sound with respect to the sound pressure level of the noise can be relatively increased, which enhances the quality of sound recording.

Moreover, if unmanned aircraft 100 includes an actuator that changes an amount of outward projection of microphone 105 from unmanned aircraft 100, the actuator may be controlled to change the amount of outward projection of microphone 105. More specifically, microphone 105 may project outwardly from unmanned aircraft 100 to approach the sound source. As a result, microphone 105 is distanced from unmanned aircraft 100 that is a noise source, and thus the sound pressure level of the noise can be reduced. Moreover, microphone 105 approaches the sound source in this case. Thus, the sound pressure level of the target sound with respect to the sound pressure level of the noise can be relatively increased. This effectively enhances the quality of sound recording. Note that the actuator may include the actuator that changes the orientation of microphone 105 and the actuator that changes the amount of projection of microphone 105. Then, processor 101 may control both of these actuators to change the orientation and the amount of projection of microphone 105. Note that the direction of projecting outwardly from unmanned aircraft 100 refers to a horizontal lateral direction of unmanned aircraft 100. Furthermore, if the quality of the target sound is lower than the goal quality after unmanned aircraft 100 is controlled to approach the sound source, control may be performed so that at least one of the orientation of microphone 105 or the amount of outward projection of microphone 105 from unmanned aircraft 100 may be changed.

[4-4. Variation 4]

Unmanned aircraft 100 according to the above embodiment includes four generators 100. However, the number of generators included in unmanned aircraft 100 is not limited to four. The number of generators may be one to three, or at least five.

[4-5. Variation 5]

Unmanned aircraft 100 according to the above embodiment includes main body 140 that is connected to four ducts 130 via four arms 141. However, this is not intended to be limiting. Four ducts 130 or four arms 141 may not be included if four generators 110 are connected to main body 140. To be more specific, the unmanned aircraft may include four generators 110 directly connected to main body 140 or include four ducts 130 directly connected main body 140. Alternatively, the unmanned aircraft may not include four ducts 130, or more specifically, may include four generators 110 that are not covered laterally.

[4-6. Variation 6]

Unmanned aircraft 100 according to the above embodiment includes four microphones 105. However, the number of microphones included in unmanned aircraft 100 is not limited to four and may be one to three, or at least five. If the number of microphones 105 is small, a plurality of pieces of sound data may be obtained at different timings by rotating the attitude of unmanned aircraft 100. Then, the sound source direction may be estimated by comparing the plurality of pieces of sound data. Microphone 105 may be disposed outside unmanned aircraft 100, or more specifically, exposed to the outside. Microphone 105 may be disposed lateral to arm 141 instead of being lateral to main body 140. Moreover, microphone 105 may be disposed at a distance from main body 140. For example, microphone 105 may be disposed at an end or some point of an arm-like rod, a line like a metallic wire, or a string-like cord that is attached to main boy 140 separately from arm 141 and extends in a direction away from main body 140.

[4-7. Variation 7]

The above embodiment describes an example in which the orientation of microphone 105 is changed if the S/N ratio is still lower than the goal S/N ratio even after the distance to sound source 400 reaches predetermined distance d1. However, this is not intended to be limiting. The high-sensitivity direction of microphone 105 may be previously aligned with the sound source direction, and then the operation described with reference to FIG. 5 in the above embodiment may be performed. For unmanned aircraft 100 including an actuator that changes the orientation of microphone 105, the actuator may be controlled to change the orientation of microphone 105 to align the high-sensitivity direction of microphone 105 with the sound source direction. For unmanned aircraft 100 including no actuator, the flight attitude of unmanned aircraft 100 may be controlled to align the high-sensitivity direction of microphone 105 with the sound source direction.

Note that, if the flight attitude of unmanned aircraft 100 is controlled to align the high-sensitivity direction of microphone 105 with the sound source direction, information indicating a range that includes a high-sensitivity direction with respect to unmanned aircraft 100 is previously stored for each of four microphones 105 in a memory that is not shown but included in unmanned aircraft 100. Thus, quality determiner 101b can determine an amount of change made by flight controller 101e in the attitude of unmanned aircraft 100, in accordance with the information on the high-sensitivity direction read from the memory and the attitude of unmanned aircraft 100 obtained from the sensors, such as acceleration sensor 103 and gyroscope sensor 104. This amount of change indicates the amount of rotation of unmanned aircraft 100 to align the sound source direction with the high-sensitivity direction.

[4-8. Variation 8]

Unmanned aircraft 100 according to the above embodiment starts sound recording if the operation signal received from controller 200 includes the signal indicating the start of sound recording. However, this is not intended to be limiting. For example, sound recording may be started if the sound data obtained by sound pickup processor 101a includes a sound recording command indicating the start of sound recording. Alternatively, sound recording may be started if a gesture of the user indicating the start of sound recording is recognized through analysis of image data obtained by camera 107 or if a speech indicating the start of sound recording is recognized from lip movements of the user. Moreover, recognition of the gesture or speech of specific key words made by the user may be used for adjusting predetermined distance d1.

Unmanned aircraft 100 may fly autonomously according to a predetermined set program, instead of being controlled by controller 200.

Controller 200 may control unmanned aircraft 100 according to a predetermined set program without an operation interface of unmanned aircraft 100.

[4-9. Variation 9]

Although unmanned aircraft 100 according to the above embodiment uses the S/N ratio as an evaluation indicator of the quality of sound recording, this is not intended to be limiting. A confidence coefficient obtained after audio recognition processing or an error rate of audio recognition may be used as the evaluation indicator of the quality.

[4-10. Variation 10]

Figure 14:
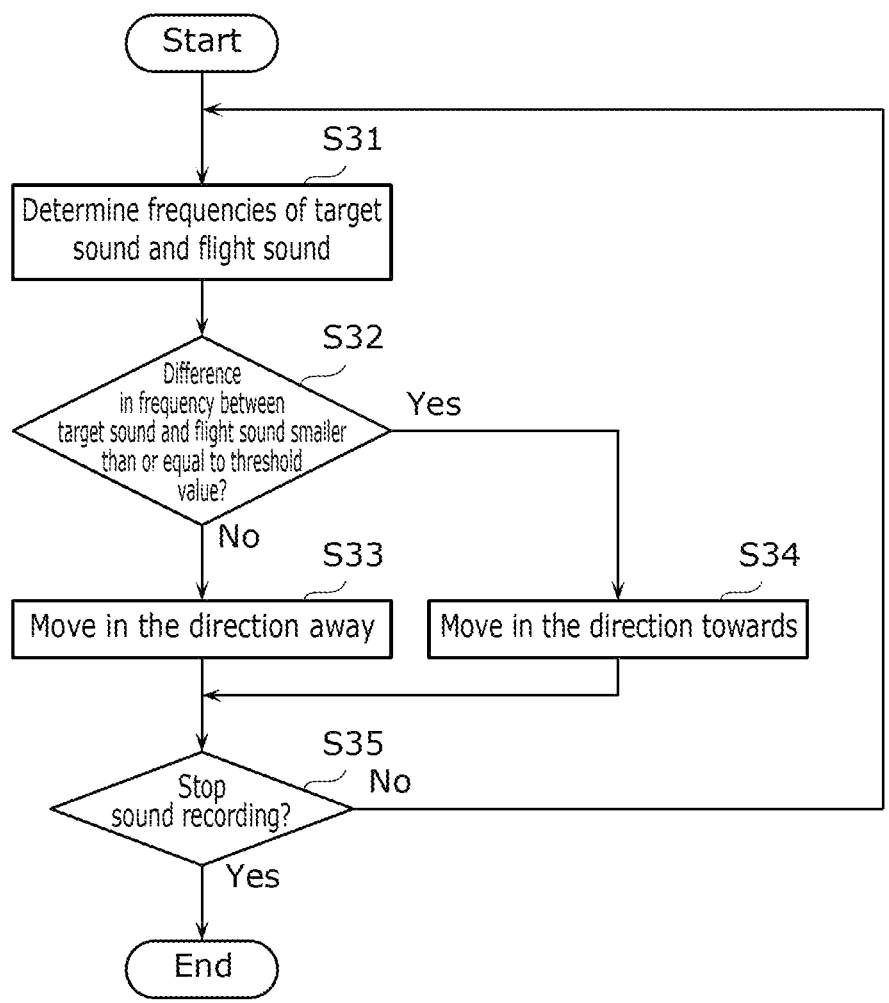
FIG. 14 is a flowchart illustrating an example of the operation for sound recording control of the unmanned aircraft according to a variation.

Unmanned aircraft 100 according to the above embodiment may control the movement using information on a frequency of the target sound and a frequency of the flight sound (that is, noise) of unmanned aircraft 100. To be more specific, quality determiner 101b determines a difference in frequency between the target sound and the flight sound. In accordance with this difference, flight controller 101e controls whether unmanned aircraft 100 is to approach or move away from the sound source. Processing according to the present variation is described with reference to FIG. 14. FIG. 14 is a flowchart illustrating an example of the operation for sound recording control of the unmanned aircraft according to Variation 10.

Quality determiner 101b determines the frequency of the target sound and the frequency of the flight sound (S31). In step S31, a frequency band of the target sound and a frequency band of the flight sound may be determined.

Next, quality determiner 101b determines whether a difference in frequency between the target sound and the flight sound is smaller than or equal to a threshold value (S32). If frequency bands are determined in step S31, a difference between center frequencies of the respective frequency bands may be used as the difference in frequency.

If the difference in frequency between the target sound and the flight sound is determined as exceeding the threshold value (No in S32), flight controller 101e performs flight control to move unmanned aircraft 100 away from the sound source (S33). When the difference in frequency is sufficiently large in this way, the quality of sound recording after the flight sound, that is, the noise, is filtered out from the picked sound can be adequately maintained even if unmanned aircraft 100 moves away from the target.

In contrast, if the difference in frequency between the target sound and the flight sound is determined as being smaller than or equal to the threshold value (Yes in S32), flight controller 101e performs flight control so that unmanned aircraft 100 approaches the sound source (S34). Such a small difference in frequency results in difficulty in maintaining the quality of sound recording after the flight sound, that is, the noise, is filtered out from the picked sound. For this reason, unmanned aircraft 100 is caused to approach the sound source.

After flight control of step S33 or S34 is performed, sound pickup processor 101a determines whether to stop sound recording (S35). If determining to stop sound recording (Yes in S35), sound pickup processor 101a ends sound control. If determining not to stop sound recording (No in S35), sound pickup processor 101a makes determination in step S31 again.

Such control of the distance from the sound source in accordance with the difference in frequency between the target sound and the flight sound (that is, the noise) eventually enables control of the distance between the sound source and unmanned aircraft 100 according to the quality of sound recording (the S/N ratio, for example).

[4-11. Variation 11]

Figure 15:
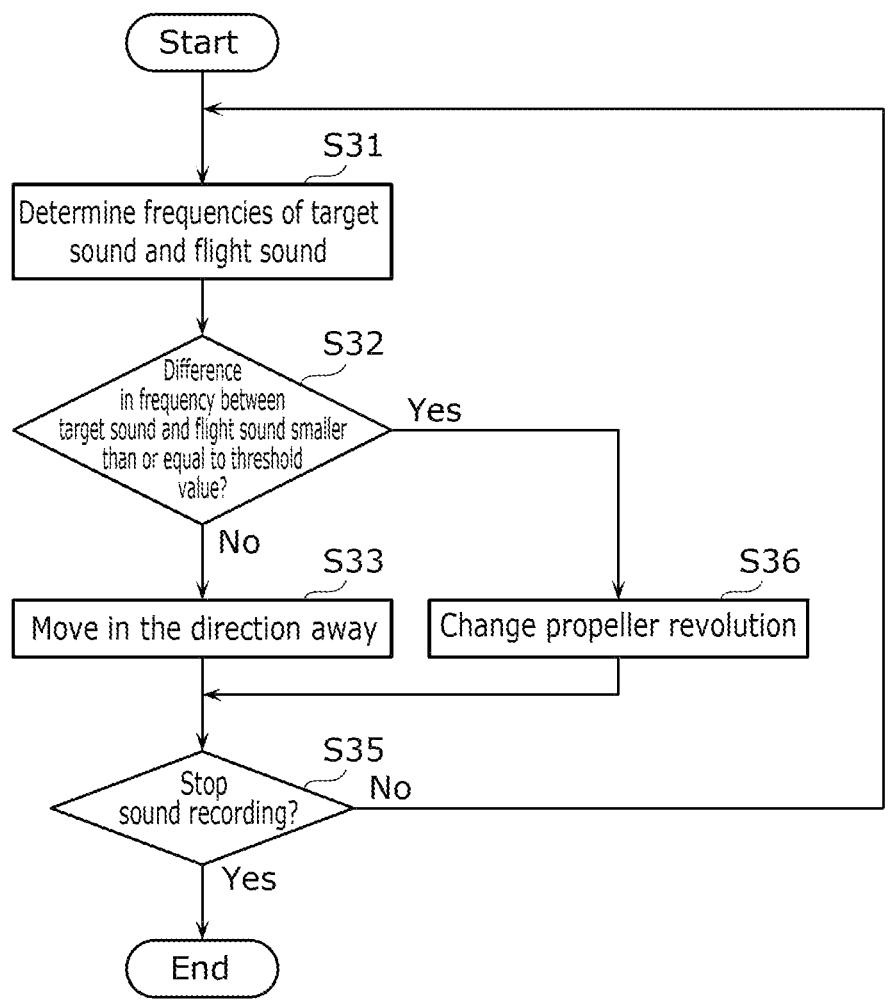
FIG. 15 is a flowchart illustrating another example of the operation for sound recording control of the unmanned aircraft according to a variation.

Unmanned aircraft 100 according to the above embodiment may control the flight sound to suppress flight control. To be more specific, flight controller 101e controls propeller revolution in accordance with a difference in frequency between the target sound and the flight sound. Processing according to the present variation is described with reference to FIG. 15. FIG. 15 is a flowchart illustrating an example of the operation for sound recording control of the unmanned aircraft according to the present variation. Description on processes that are substantially the same as those in FIG. 14 is not repeated here.

Quality determiner 101b determines the frequency of the target sound and the frequency of the flight sound (S31).

Next, quality determiner 101b determines whether a difference in frequency between the target sound and the flight sound is smaller than or equal to a threshold value (S32).

If the difference in frequency between the target sound and the flight sound is determined as exceeding the threshold value (No in S32), flight controller 101e performs flight control to move unmanned aircraft 100 away from the sound source (S33).

In contrast, if the difference in frequency between the target sound and the flight sound is determined as being smaller than or equal to the threshold value (Yes in S32), flight controller 101e controls the propeller revolution to increase the difference in frequency (S36). For example, flight controller 101e changes the number of propeller revolutions so that the difference in frequency between the flight sound and the target sound increases.

Such flight control performed to increase the difference in frequency between the target sound and the flight sound enhances the quality of sound recording. Moreover, such control keeps unmanned aircraft 100 from approaching the sound source.

Note that after the movement control or flight control is performed in accordance with the difference in frequency between the target sound and the flight sound according to Variation 11 or 12, the movement control based on the quality of sound recording may be performed as in the above embodiment.

[4-12. Variation 12]

Unmanned aircraft 100 according to the above embodiment may move within an area in which the quality of the target sound satisfies the goal quality. To be more specific, flight controller 101e determines, as a movement allowance area, the area in which the quality of the target sound satisfies the goal quality, and then limits the movement of unmanned aircraft 100 within this movement allowance area. For example, when receiving the operation signal from controller 200, flight controller 101e performs an operation to move unmanned aircraft 100 within the movement allowance area and does not perform an operation to move unmanned aircraft 100 outside the movement allowance area.

Each of the components in the above embodiment may be configured with dedicated hardware or may be implemented by executing a software program suitable for the component. Each of the components may be implemented by a program executer, such as a CPU or a processor, reading and executing a software program recorded on a hard disk or a non-temporary recording medium, such as a semiconductor memory. Here, software that implements, for example, unmanned aircraft 100 and the information processing method according to the above embodiment is the following program.

More specifically, this program is an information processing method executed by a processor, which is a computer, included in an unmanned aircraft that includes the processor and a sensor including at least a microphone that generates sound data. The information processing method includes: determining quality of a target sound using the sound data generated by the microphone; obtaining a positional relationship between the unmanned aircraft and a sound source of the target sound using data generated by the sensor; and controlling movement of the unmanned aircraft to control a distance between the unmanned aircraft and the sound source of the target sound, in accordance with the quality of the target sound and the positional relationship.

Although the unmanned aircraft, the information processing method, and the program in an aspect or aspects according to the present disclosure have been described by way of the above embodiment, it should be obvious that the present disclosure is not limited to the above embodiment. Other embodiments implemented through various changes and modifications conceived by a person of ordinary skill in the art or through a combination of the structural elements in different embodiments described above may be included in the scope in an aspect or aspects according to the present disclosure, unless such changes, modifications, and combination depart from the scope of the present disclosure.

Note that machine learning may be used in: the processes performed by quality determiner 101b, sound source determiner 101c, obstruction detector 101g, and flight controller 101e; the image recognition processing; and the sound recognition processing. Types of machine learning algorithms include, for example: supervised learning algorithms that learn a relationship between an input and an output using training data given a label (output information) associated with input information; unsupervised learning algorithms that find a data structure from only unlabeled inputs; semi-supervised learning that approaches both labeled training data and unlabeled training data; and reinforcement learning algorithms that learn a set of actions leading to the highest reward by receiving feedback (reward) from an action chosen as a result of state observation. Specific approaches of machine learning include: a neural network (including deep learning using a multi-layered neural network); genetic programming; decision tree; Bayesian network; and support vector machine (SVM). Any one of the aforementioned specific examples may be used in the present disclosure.

Although only the exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is useful as an unmanned aircraft, an information processing method, and a program that are capable of enhancing the quality of a target sound.

The invention claimed is:

1. An unmanned aircraft, comprising:
a sensor that includes at least a microphone that generates sound data by picking up sound; and
a processor,
wherein the processor
determines sound recording quality of a target sound obtained using the sound data generated by the microphone,
obtains a positional relationship between the unmanned aircraft and a sound source of the target sound using data generated by the sensor,
controls movement of the unmanned aircraft to control a distance between the unmanned aircraft and the sound source of the target sound, in accordance with the sound recording quality of the target sound and the positional relationship,
the processor further obtains distance information indicating a predetermined distance from the sound source, and
when causing the unmanned aircraft to approach the sound source, the processor causes the unmanned aircraft to move in accordance with the distance information and the positional relationship so that the unmanned aircraft does not approach any closer to the sound source than a safety position at the predetermined distance from the sound source,
if it is determined in the determination that a quality of a first target sound obtained by using first sound data generated as the sound data by the microphone of the unmanned aircraft which has been moved closer to a first safety position is higher than a predetermined goal quality when the processor has caused the unmanned aircraft to move to approach closer to the sound source to the first safety position, as the safety position, which is away from the sound source by the predetermined distance, the processor further causes the unmanned aircraft to move to a second safety position, wherein a quality of a second target sound is equivalent to the goal quality, the quality of the second target sound being obtained by using second sound data which is generated as the sound data by the microphone of the unmanned aircraft at the second safety position,
a positon of the unmanned aircraft in a height direction included in the first safety position is higher than a position of the sound source in the height direction,
a positon of the unmanned aircraft in the height direction included in the second safety position is lower than the position of the unmanned aircraft included in the first safety position and the second safety position is away from the sound source by the predetermined distance, and in the movement of the unmanned aircraft to the second safety position, the processor causes the unmanned aircraft to move from the first safety position to the second safety position along a semicircle having a radius of the predetermined distance centered at a position of the sound source, so that the unmanned aircraft is moved in a direction in which the position of the unmanned aircraft in the height direction approaches to the ground and the unmanned aircraft goes away from the sound source in a horizontal direction of the unmanned aircraft.

2. The unmanned aircraft according to claim 1, wherein when it is determined in the determination that the quality of the target sound is lower than the goal quality, the processor causes the unmanned aircraft to move to approach the sound source.

3. The unmanned aircraft according to claim 1, further comprising:
an actuator that changes at least one of an orientation of the microphone relative to the unmanned aircraft or an amount of outward projection of the microphone from the unmanned aircraft,
wherein if the quality of the first target sound is lower than the goal quality when the processor has moved the unmanned aircraft in accordance with the distance information and the positional relationship to cause the unmanned aircraft to move, to approach the sound source, to the first safety position, the processor causes the actuator to change at least one of (i) the orientation of the microphone to be directed to the sound source or (ii) the amount of outward projection of the microphone from the unmanned aircraft so that the microphone is closer to the sound source.

4. The unmanned aircraft according to claim 1, wherein, in the determination, the processor calculates a signal-to-noise (S/N) ratio using the target sound and noise related to flight of the unmanned aircraft, as an indicator for determining the quality.

5. The unmanned aircraft according to claim 4, wherein the processor
further obtains a goal S/N ratio precalculated using the noise related to actuation of the motor in the flight of the unmanned aircraft, as the predetermined goal quality, and
determines the quality of the target sound by comparing the goal S/N ratio obtained and the S/N ratio calculated.

6. The unmanned aircraft according to claim 1, wherein the sensor further includes an image sensor that generates image data, and
the processor obtains the positional relationship using the image data generated by the image sensor.

7. The unmanned aircraft according to claim 1, wherein the sensor further includes a ranging sensor that generates ranging data, and
the processor obtains the positional relationship using the ranging data generated by the ranging sensor.

8. The unmanned aircraft according to claim 1, wherein the processor determines a goal distance between the unmanned aircraft and the sound source in accordance with the quality of the target sound, the positional relationship, and the goal quality, and controls the movement of the unmanned aircraft to achieve the goal distance.

9. The unmanned aircraft according to claim 1, wherein the positional relationship is at least one of (i) the distance between the unmanned aircraft and the sound source, (ii) a position of the sound source with respect to the unmanned aircraft, or (iii) a direction from the unmanned aircraft to the sound source.

10. An information processing method performed by a processor included in an unmanned aircraft, the unmanned aircraft including the processor and a sensor, the sensor including at least a microphone that generates sound data by picking up sound, the information processing method comprising:
determining sound recording quality of a target sound obtained using the sound data generated by the microphone;
obtaining a positional relationship between the unmanned aircraft and a sound source of the target sound using data generated by the sensor;
controlling movement of the unmanned aircraft to control a distance between the unmanned aircraft and the sound source of the target sound, in accordance with the quality of the target sound and the positional relationship, and
obtaining distance information indicating a predetermined distance from the sound source, and
when causing the unmanned aircraft to approach the sound source, the processor causes the unmanned aircraft to move in accordance with the distance information and the positional relationship so that the unmanned aircraft does not approach any closer to the sound source than a safety position at the predetermined distance from the sound source,
if it is determined in the determining that a quality of a first target sound obtained by using first sound data generated as the sound data by the microphone of the unmanned aircraft which has been moved closer to a first safety position is higher than a predetermined goal quality when the processor has caused the unmanned aircraft to move to approach closer to the sound source to the first safety position, as the safety position, which is away from the sound source by the predetermined distance, the processor further causing the unmanned aircraft to move to a second safety position, wherein a quality of a second target sound is equivalent to the goal quality, the quality of the second target sound being obtained by using second sound data which is generated as the sound data by the microphone of the unmanned aircraft at the second safety position,
wherein a positon of the unmanned aircraft in a height direction included in the first safety position is higher than a position of the sound source in the height direction,
a positon of the unmanned aircraft in the height direction included in the second safety position is lower than the position of the unmanned aircraft included in the first safety position and the second safety position is away from the sound source by the predetermined distance, and
in the movement of the unmanned aircraft to the second safety position, the processor causing the unmanned aircraft to move from the first safety position to the second safety position along a semicircle having a radius of the predetermined distance centered at a position of the sound source, so that the unmanned aircraft is moved in a direction in which the position of the unmanned aircraft in the height direction approaches to the ground and the unmanned aircraft goes away from the sound source in a horizontal direction of the unmanned aircraft.

11. A non-transitory computer-readable recording medium for use in a processor included in an unmanned aircraft that includes the processor and a sensor, the sensor including at least a microphone that generates sound data by picking up sound, the recording medium having a computer program recorded thereon for causing the processor to execute an information processing method comprising:
  determining sound recording quality of a target sound obtained using the sound data generated by the microphone;
  obtaining a positional relationship between the unmanned aircraft and a sound source of the target sound using data generated by the sensor;
  controlling movement of the unmanned aircraft to control a distance between the unmanned aircraft and the sound source of the target sound, in accordance with the quality of the target sound and the positional relationship, and
  obtaining distance information indicating a predetermined distance from the sound source, and
  when causing the unmanned aircraft to approach the sound source, the processor causes the unmanned aircraft to move in accordance with the distance information and the positional relationship so that the unmanned aircraft does not approach any closer to the sound source than a safety position at the predetermined distance from the sound source,
  if it is determined in the determining that a quality of a first target sound obtained by using first sound data generated as the sound data by the microphone of the unmanned aircraft which has been moved closer to a first safety position is higher than a predetermined goal quality when the processor has caused the unmanned aircraft to move to approach closer to the sound source to the first safety position, as the safety position, which is away from the sound source by the predetermined distance, the processor further causing the unmanned aircraft to move to a second safety position, wherein a quality of a second target sound is equivalent to the goal quality, the quality of the second target sound being obtained by using second sound data which is generated as the sound data by the microphone of the unmanned aircraft at the second safety position,
  wherein a positon of the unmanned aircraft in a height direction included in the first safety position is higher than a position of the sound source in the height direction,
  a positon of the unmanned aircraft in the height direction included in the second safety position is lower than the position of the unmanned aircraft included in the first safety position and the second safety position is away from the sound source by the predetermined distance, and
  in the movement of the unmanned aircraft to the second safety position, the processor causing the unmanned aircraft to move from the first safety position to the second safety position along a semicircle having a radius of the predetermined distance centered at a position of the sound source, so that the unmanned aircraft is moved in a direction in which the position of the unmanned aircraft in the height direction approaches to the ground and the unmanned aircraft goes away from the sound source in a horizontal direction of the unmanned aircraft.

* * * * *